US012809166B2

(12) United States Patent
Kitahara et al.

(10) Patent No.: US 12,809,166 B2
(45) Date of Patent: Nov. 24, 2026

(54) IMAGE DISPLAY DEVICE

(71) Applicant: NICHIA CORPORATION, Anan (JP)

(72) Inventors: Wataru Kitahara, Kamiina-gun (JP); Takanori Aruga, Suwa-gun (JP); Hajime Akimoto, Anan (JP)

(73) Assignee: NICHIA CORPORATION, Anan (JP)

( * ) Notice: Subject to any disclaimer, the term of this patent is extended or adjusted under 35 U.S.C. 154(b) by 264 days.

(21) Appl. No.: 18/543,762

(22) Filed: Dec. 18, 2023

(65) Prior Publication Data

US 2024/0210684 A1 Jun. 27, 2024

(30) Foreign Application Priority Data

Dec. 27, 2022 (JP) ................................ 2022-209918

(51) Int. Cl.
*G02B 27/01* (2006.01)
*B60K 35/23* (2024.01)
(Continued)

(52) U.S. Cl.
CPC .......... *G02B 27/0101* (2013.01); *B60K 35/23* (2024.01); *G02B 5/124* (2013.01); (Continued)

(58) Field of Classification Search
CPC .................... G02B 30/56; G02B 5/124; G02B 2027/0145; G02B 27/0018
See application file for complete search history.

(56) References Cited

U.S. PATENT DOCUMENTS 5,729,242 A 3/1998 Margerum et al.
5,764,407 A 6/1998 Nanba
(Continued)

FOREIGN PATENT DOCUMENTS

JP H03-273943 A 12/1991
JP H06-347708 A 12/1994
(Continued)

OTHER PUBLICATIONS

Notice of Allowance in U.S. Appl. No. 18/511,505 dated May 14, 2026.
(Continued)

*Primary Examiner* — Alexander P Gross
(74) *Attorney, Agent, or Firm* — Foley & Lardner LLP

(57) ABSTRACT

An image display device includes: a light source unit including: a first display device configured to emit light having a substantially Lambertian light distribution and to display a first image, and an imaging optical system including: an input element on which light emitted from the first display device is incident, and an output element on which light traveling via the input element is incident, the output element being configured to emit light that forms a real image corresponding to the first image; a reflection unit separated from the light source unit, the reflection unit configured to reflect light emitted from the imaging optical system; a second display device configured to display a second image; and an image-forming element configured to display the second image in mid-air based on light emitted from the second display device. The imaging optical system is substantially telecentric at the real image side.

14 Claims, 13 Drawing Sheets

(51) Int. Cl.
*G02B 5/124* (2006.01)
*G02B 30/56* (2020.01)

(52) U.S. Cl.
CPC .......... *G02B 30/56* (2020.01); *B60K 2360/23* (2024.01); *B60K 2360/332* (2024.01); *B60K 2360/349* (2024.01); *G02B 2027/0145* (2013.01)

(56) References Cited

U.S. PATENT DOCUMENTS

| | | | | |
|---|---|---|---|---|
| 10,606,075 | B2 | 3/2020 | Choi et al. | |
| 11,169,377 | B1 | 11/2021 | Chen | |
| 11,287,649 | B2 | 3/2022 | Hong | |
| 2003/0035232 | A1 | 2/2003 | Sasaki | |
| 2003/0107716 | A1 | 6/2003 | Ogawa | |
| 2004/0145814 | A1 | 7/2004 | Rogers | |
| 2005/0007593 | A1 | 1/2005 | Lebens | |
| 2005/0052617 | A1 | 3/2005 | Fujikawa et al. | |
| 2007/0024977 | A1 | 2/2007 | Kawamura et al. | |
| 2007/0146242 | A1 | 6/2007 | Miller et al. | |
| 2008/0316606 | A1 | 12/2008 | Inoguchi et al. | |
| 2009/0040588 | A1 | 2/2009 | Tonar et al. | |
| 2009/0167989 | A1 | 7/2009 | Ito et al. | |
| 2010/0109977 | A1 | 5/2010 | Yamazaki et al. | |
| 2010/0271396 | A1 | 10/2010 | Nemeth et al. | |
| 2011/0164311 | A1 | 7/2011 | Morikuni | |
| 2012/0020092 | A1 | 1/2012 | Bailey | |
| 2015/0253469 | A1 | 9/2015 | Le Gros et al. | |
| 2015/0378104 | A1 | 12/2015 | Takahashi | |
| 2017/0146803 | A1 | 5/2017 | Kishigami et al. | |
| 2017/0146809 | A1 | 5/2017 | Furuya | |
| 2018/0024335 | A1 | 1/2018 | Uehara | |
| 2018/0039077 | A1 | 2/2018 | Kuzuhara et al. | |
| 2018/0352204 | A1 | 12/2018 | Fujita | |
| 2018/0358339 | A1 | 12/2018 | Iguchi | |
| 2019/0011712 | A1 | 1/2019 | Nagano et al. | |
| 2019/0049725 | A1 | 2/2019 | Kondo et al. | |
| 2019/0061525 | A1 | 2/2019 | Ji | |
| 2019/0061638 | A1 | 2/2019 | Hisatsugu et al. | |
| 2019/0071014 | A1 | 3/2019 | Misu | |
| 2019/0072764 | A1 | 3/2019 | Lee et al. | |
| 2019/0072799 | A1 | 3/2019 | Narushima | |
| 2019/0073828 | A1 | 3/2019 | Oiwa | |
| 2019/0235240 | A1 | 8/2019 | Nagano et al. | |
| 2020/0050005 | A1 | 2/2020 | Kojima et al. | |
| 2020/0201036 | A1 | 6/2020 | Hong | |
| 2020/0271927 | A1 | 8/2020 | Kawana | |
| 2020/0319456 | A1 | 10/2020 | Yatsu et al. | |
| 2020/0333608 | A1 | 10/2020 | Katagiri et al. | |
| 2021/0239989 | A1 | 8/2021 | Ide et al. | |
| 2021/0325700 | A1 | 10/2021 | Chen | |
| 2021/0373331 | A1 | 12/2021 | Gu et al. | |
| 2021/0382304 | A1 | 12/2021 | You et al. | |
| 2022/0035165 | A1 | 2/2022 | Takeda et al. | |
| 2022/0046212 | A1 | 2/2022 | Xu et al. | |
| 2022/0138916 | A1 | 5/2022 | Takagi et al. | |
| 2022/0350139 | A1 | 11/2022 | Tsuda et al. | |
| 2022/0365266 | A1 | 11/2022 | Cheng et al. | |
| 2022/0365345 | A1 | 11/2022 | Hamada | |
| 2023/0026137 | A1 | 1/2023 | Kusafuka et al. | |
| 2023/0034288 | A1 | 2/2023 | Hong et al. | |
| 2023/0118416 | A1 | 4/2023 | Hirata et al. | |
| 2023/0206795 | A1 | 6/2023 | Lyou et al. | |
| 2023/0207606 | A1 | 6/2023 | Mezouari et al. | |
| 2023/0415576 | A1 | 12/2023 | Zozgornik | |
| 2024/0061240 | A1 | 2/2024 | Hirata et al. | |
| 2024/0134189 | A1* | 4/2024 | Shimose ................ | B60K 35/10 |
| 2024/0210684 | A1 | 6/2024 | Kitahara et al. | |
| 2024/0241421 | A1 | 7/2024 | Marchewka et al. | |

FOREIGN PATENT DOCUMENTS

| | | | |
|---|---|---|---|
| JP | H07-140918 | A | 6/1995 |
| JP | H07-306377 | A | 11/1995 |
| JP | H09-200651 | A | 7/1997 |
| JP | H10-274740 | A | 10/1998 |
| JP | 2003-005073 | A | 1/2003 |
| JP | 2003-043360 | A | 2/2003 |
| JP | 2003-177320 | A | 6/2003 |
| JP | 2004-045718 | A | 2/2004 |
| JP | 2004-527801 | A | 9/2004 |
| JP | 2005-070255 | A | 3/2005 |
| JP | 2007-058163 | A | 3/2007 |
| JP | 2009-003128 | A | 1/2009 |
| JP | 2009-251194 | A | 10/2009 |
| JP | 2010-107873 | A | 5/2010 |
| JP | 2011-138086 | A | 7/2011 |
| JP | 2013-183042 | A | 9/2013 |
| JP | 2014-183192 | A | 9/2014 |
| JP | 2016-033867 | A | 3/2016 |
| JP | 2016-102810 | A | 6/2016 |
| JP | 2016-148829 | A | 8/2016 |
| JP | 2017-037304 | A | 2/2017 |
| JP | 2017-049371 | A | 3/2017 |
| JP | 2019-073272 | A | 5/2019 |
| JP | 2019-095690 | A | 6/2019 |
| JP | 2020-012986 | A | 1/2020 |
| JP | 2020-074005 | A | 5/2020 |
| JP | 2020-144184 | A | 9/2020 |
| JP | 6809441 | B2 | 1/2021 |
| JP | 2021-124527 | A | 8/2021 |
| JP | 2021-162801 | A | 10/2021 |
| JP | 2021-529332 | A | 10/2021 |
| JP | 2022-025889 | A | 2/2022 |
| JP | 2022-073094 | A | 5/2022 |
| JP | 2022-129223 | A | 9/2022 |
| WO | WO-2014/207457 | A1 | 12/2014 |
| WO | WO-2015/190157 | A1 | 12/2015 |
| WO | WO-2016/103418 | A1 | 6/2016 |
| WO | WO-2016/208195 | A1 | 12/2016 |
| WO | WO-2017/138242 | A1 | 8/2017 |
| WO | WO-2017/154360 | A1 | 9/2017 |
| WO | WO-2017/170702 | A1 | 10/2017 |
| WO | WO-2019/008684 | A1 | 1/2019 |
| WO | WO-2019/130860 | A1 | 7/2019 |
| WO | WO-2019/130944 | A1 | 7/2019 |
| WO | WO-2021/054277 | A1 | 3/2021 |
| WO | WO-2021/065820 | A1 | 4/2021 |
| WO | WO-2021/106689 | A1 | 6/2021 |

OTHER PUBLICATIONS

Non-Final Office Action in U.S. Appl. No. 18/538,112 dated Nov. 5, 2024.
Non-Final Office Action in U.S. Appl. No. 18/691,498 dated Jan. 23, 2026.
U.S. Appl. No. 18/496,594, filed Oct. 27, 2023, Kitahara et al.
U.S. Appl. No. 18/511,505, filed Nov. 16, 2023, Kitahara et al.
U.S. Appl. No. 18/513,895, filed Nov. 20, 2023, Kitahara et al.
U.S. Appl. No. 18/538,112, filed Dec. 13, 2023, Aruga et al.
Non-Final Office Action in U.S. Appl. No. 18/511,505 dated Feb. 13, 2026.
Non-Final Office Action on U.S. Appl. No. 18/390,954 dated Dec. 4, 2025.
Non-Final Office Action in U.S. Appl. No. 18/538,112 dated Mar. 19, 2025.
U.S. Appl. No. 18/390,954, filed Dec. 20, 2023, Kitahara et al.
Notice of Allowance in U.S. Appl. No. 18/513,895 DTD Aug. 6, 2024.
Final Office Action in U.S. Appl. No. 18/538,112 dated Jul. 22, 2025.
Non-Final Office Action in U.S. Appl. No. 18/496,594 DTD Jul. 11, 2024.
U.S. Appl. No. 18/543,762, filed Dec. 18, 2023, Kitahara et al.
U.S. Appl. No. 18/691,498, filed Mar. 13, 2024, Kitahara et al.
U.S. Appl. No. 18/867,745, filed Nov. 20, 2024, Kitahara et al.
U.S. Appl. No. 18/870,981, filed Dec. 2, 2024, Kitahara et al.
U.S. Appl. No. 18/956,890, filed Nov. 22, 2024, Kitahara et al.
Notice of Allowance in U.S. Appl. No. 18/496,594 dated Dec. 4, 2024.

(56) References Cited

OTHER PUBLICATIONS

Notice of Allowance in U.S. Appl. No. 18/956,890 dated Jul. 2, 2026.
Non-Final Office Action in U.S. Appl. No. 18/867,745 dated Aug. 3, 2026.
Non-Final Office Action in U.S. Appl. No. 18/870,981 dated Aug. 10, 2026.
Notice of Allowance in U.S. Appl. No. 18/978,166 dated Aug. 14, 2026.
Notice of Reasons for Refusal issued in Japanese Appl. No. 2022-182313 dated Sep. 2, 2026.
Notice of Reasons for Refusal issued in Japanese Appl. No. 2024-524176 dated Aug. 26, 2026.
Notice of Reasons for Refusal issued in Japanese Appl. No. 2024-526238 dated Aug. 26, 2026.
Office Action issued in Japanese Appl. No. 2022-194460 dated Oct. 9, 2026.

* cited by examiner

IMAGE DISPLAY DEVICE

CROSS-REFERENCE TO RELATED APPLICATIONS

This application is based upon and claims priority to Japanese Patent Application No. 2022-209918, filed on Dec. 27, 2022, the entire contents of which are incorporated herein by reference.

FIELD

Embodiments described herein relate generally to an image display device.

BACKGROUND

In known art, light that is emitted from a display device configured to display an image is sequentially reflected by multiple mirrors, and the light reflected by the final mirror is further reflected toward a user by a reflecting member such as a windshield or the like, so that the user views a virtual image corresponding to the image displayed by the display device (see, e.g., PCT Publication No. WO2016/208195).

SUMMARY

An embodiment of the invention is directed to an image display device that is small and can display a high-quality image.

An image display device according to an embodiment of the invention includes a light source unit, a reflection unit, a second display device, and an image-forming element; the light source unit includes a first display device and an imaging optical system; the first display device is configured to display a first image; the imaging optical system includes an input element on which light emitted from the first display device is incident, and an output element on which light traveling via the input element is incident; light emitted from the output element forms a real image corresponding to the first image; the reflection unit is separated from the light source unit and reflects light emitted from the imaging optical system; the second display device is configured to display a second image; and the image-forming element displays the second image in mid-air based on light emitted from the second display device. The imaging optical system is substantially telecentric at the real image side. The light that is emitted from the first display device has a substantially Lambertian light distribution. The real image that corresponds to the first image is formed between the light source unit and the reflection unit.

DETAILED DESCRIPTION

Figure 1:
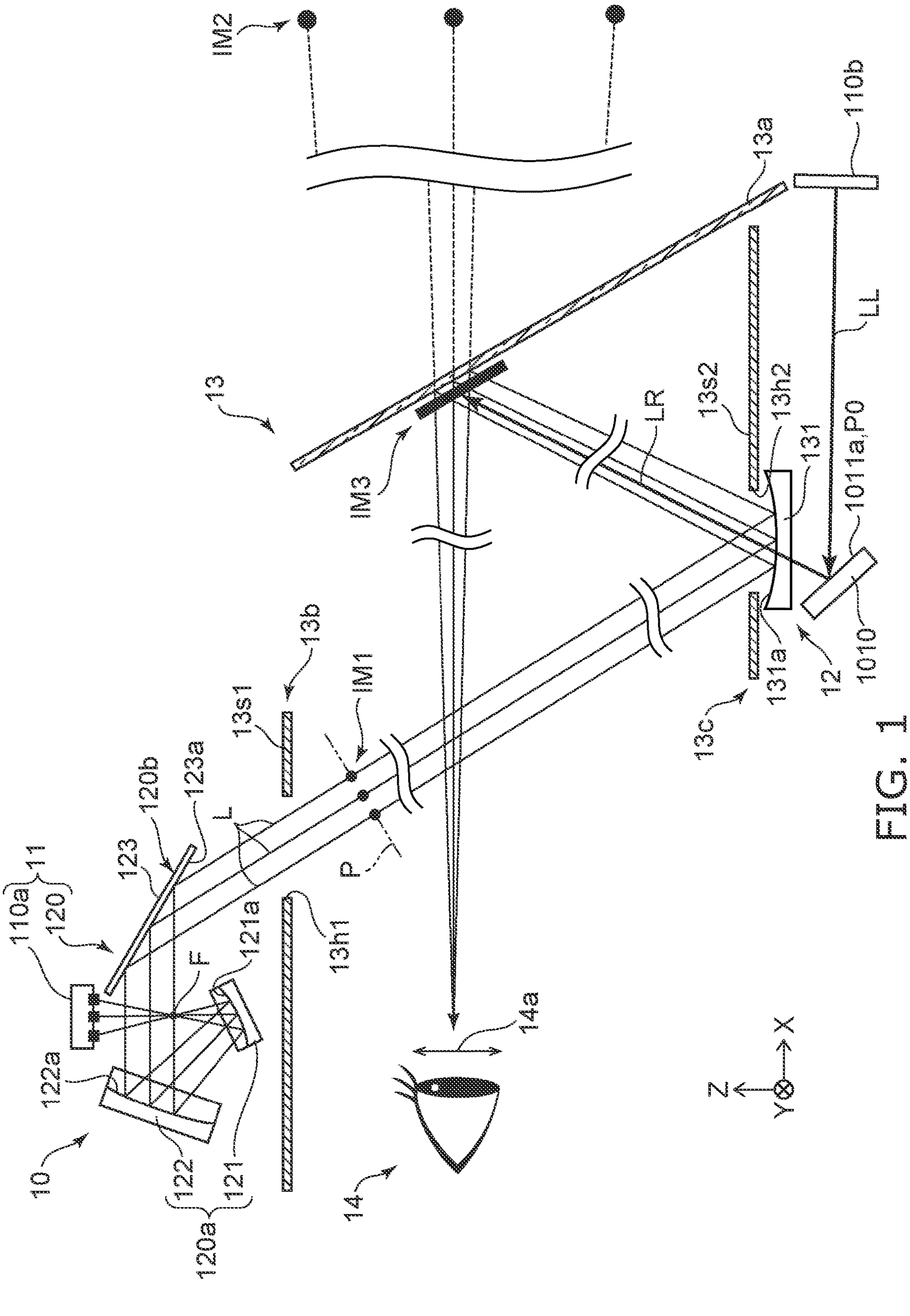
FIG. 1 is a schematic cross-sectional view illustrating an image display device according to a first embodiment.

Exemplary embodiments will now be described with reference to the drawings. The drawings are schematic or conceptual, and the relationships between the thickness and width of portions, the proportional coefficients of sizes among portions, etc., are not necessarily the same as the actual values thereof. In the specification of the application and the drawings, components similar to those described in regard to a drawing thereinabove are marked with like reference numerals, and a detailed description is omitted as appropriate.

FIRST EMBODIMENT

FIG. 1 is a schematic cross-sectional view illustrating an image display device according to a first embodiment.

As shown in FIG. 1, the image display device 10 according to the embodiment includes a light source unit 11, a reflection unit 12, a display device (a second display device) 110*b*, and an image-forming element 1010, and the light source unit 11 includes a display device (a first display device) 110*a*. In FIG. 1, the image display device 10 is partially enlarged to more clearly show the configurations of the light source unit 11, the reflection unit 12, the display device 110*b*, and the image-forming element 1010.

The light source unit 11 includes the display device (the first display device) 110*a* and an imaging optical system 120. The display device 110*a* is configured to display a first image. The light that is emitted from the display device 110*a* is incident on the imaging optical system 120, and the imaging optical system 120 forms a real image (an image corresponding to the first image) IM1 that corresponds to the first image displayed by the display device 110*a*. The reflection unit 12 reflects the light emitted from the light source unit 11. The real image IM1 that corresponds to the first image is formed between the light source unit 11 and the reflection unit 12. The real image IM1 that corresponds to the first image is a real image and is an intermediate image.

In the drawings for the description related to the light source unit and the reflection unit, the positions at which the real image IM1 corresponding to the first image is formed are shown by circular marks for easier understanding of the description. The positions of the display device 110*a* from which main rays L that reach the marks of the real image IM1 corresponding to the first image are emitted are shown by quadrilateral marks. Thus, although different marks are used to show the emission positions on the display device 110*a* and the arrival positions at the real image IM1 corresponding to the first image of the main rays L, the image displayed on the display device 110*a* and the real image IM1 corresponding to the first image have substantially similar shapes.

The display device (the second display device) 110*b* is configured to display a second image. The second image that is displayed by the display device 110*b* can be a different image from the first image displayed by the display device 110*a*. The image-forming element 1010 is arranged so that light LL emitted from the display device 110*b* is incident on the image-forming element 1010. The image-forming element 1010 reflects the incident light LL and emits a reflected light LR. The image that is displayed by the display device 110*b* is formed by the light LL. Therefore, the reflected light LR is formed as a floating image by the light LL being incident on the image-forming element 1010, and by the image-forming element 1010 emitting the reflected light LR, thereby forming an image corresponding to the second image displayed by the display device 110*b* as a mid-air image IM3. For easier understanding of the description for the description related to the display device 110*b* and the image-forming element 1010, the light LL that is emitted from the display device 110*b* is shown as one main ray, the reflected light LR that is reflected by the image-forming element is shown as one main ray, and both the light LL and the reflected light LR are illustrated by thick arrows.

For example, the image display device 10 is mounted in a vehicle 13 such as an automobile, etc. A user 14 of the image display device 10 is, for example, the driver of the vehicle 13. The light source unit 11 and the reflection unit 12 of the image display device 10 function as a HUD (Head Up Display) mounted in the vehicle 13.

Specifically, the greater part of the light reflected by the reflection unit 12 is reflected by the inner surface of a front windshield 13*a* of the vehicle 13, i.e., the surface of the front windshield 13*a* facing the user 14 inside the vehicle. The light that is reflected by the inner surface of the front windshield 13*a* enters an eyebox 14*a* of the user 14. That is, the inner surface of the front windshield 13*a* of the vehicle 13 functions as a reflecting surface. As a result, the user 14 can view a virtual image IM2 corresponding to the first image displayed by the display device 110*a*. The virtual image IM2 is larger than the real image IM1 corresponding to the first image.

In the specification, "eyebox" means the area of space in front of the eyes of the user where the virtual image is visible. In the drawings, similar to the real image IM1 corresponding to the first image, the position at which the virtual image IM2 is formed is shown by circular marks for easier understanding of the description. Similar to the real image IM1 corresponding to the first image, although the emission positions of the main rays L on the display device 110*a* and the arrival positions at the virtual image IM2 are shown by marks of different shapes, the virtual image IM2 and the first image displayed on the display device 110*a* have substantially similar shapes.

The display device 110*b* and the image-forming element 1010 of the image display device 10 function as an image display device that displays the mid-air image IM3. Specifically, the light LL that is emitted from the display device 110*b* is reflected by the image-forming element 1010 and forms the mid-air image IM3. The mid-air image IM3 is a real image.

The virtual image IM2 and the mid-air image IM3 can be formed at the desired positions by setting the arrangement, mounting angle, and the like of the light source unit 11, the reflection unit 12, the display device 110*b*, and the image-forming element 1010. As described above, the user 14 can view the mid-air image IM3 simultaneously with the virtual image IM2 via the same eyebox 14*a*. The mid-air image IM3 can be formed on the front windshield 13*a* as in FIG. 1, or can be formed as a floating image between the front windshield 13*a* and the eyebox 14*a*. The mid-air image IM3 also can be formed as a floating image between the front windshield 13*a* and the image-forming element 1010.

Figure 2:
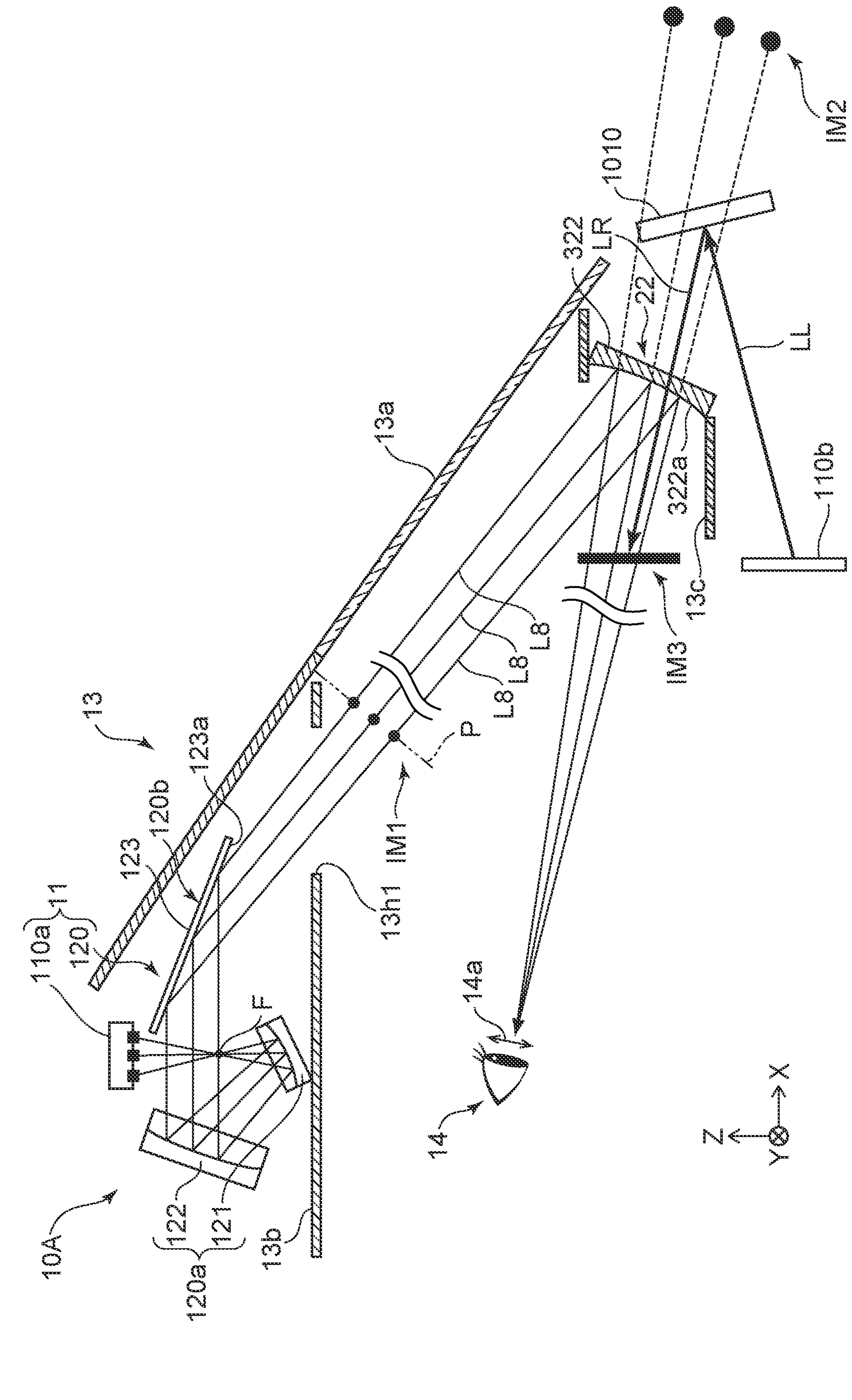
FIG. 2 is a schematic cross-sectional view illustrating an image display device according to a modification of the first embodiment.

FIG. 2 is a schematic cross-sectional view illustrating an image display device according to a modification of the first embodiment.

As shown in FIG. 2, the image display device 10A according to the modification includes the light source unit 11, a reflection unit 22, the display device 110*b*, and the image-forming element 1010. The modification differs from the image display device 10 shown in FIG. 1 in that the virtual image IM2 is projected onto a mirror 322, which is a combiner, instead of the inner surface of the front windshield 13*a*. The mirror 322 is included in the reflection unit 22.

According to the modification, the display device 110*b* is located lower than the mirror 322, and the image-forming element 1010 is located at the side opposite to a mirror surface 322*a* of the mirror 322. By such an arrangement, the user 14 can view the mid-air image IM3 simultaneously with the virtual image IM2 via the same eyebox 14*a*.

Components of the image display devices 10 and 10A will now be elaborated. In the description of the configurations of the image display devices 10 and 10A hereinbelow, an XYZ orthogonal coordinate system is used for easier understanding of the description. Hereinbelow, the direction in which an X-axis extends is called an "X-direction," the direction in which a Y-axis extends is called a "Y-direction," and the direction in which a Z-axis extends is called a "Z-direction." An example is described in the embodiment in which the longitudinal direction of the vehicle 13 is along the "X-direction," the lateral direction of the vehicle 13 is along the "Y-direction," and the vertical direction of the vehicle 13 is along the "Z-direction." In other words, in the following examples, the XY-plane is the horizontal plane of the vehicle 13. This is similar for image display devices 20, 30, and 100 according to other embodiments described below with reference to FIGS. 9, 11, and 14. This is similar for a light source unit 31 described below with reference to FIG. 13.

Hereinbelow, the X-direction in the direction of the arrow also is called the "+X direction," and the opposite direction also is called the "−X direction." The Y-direction in the direction of the arrow also is called the "+Y direction," and the opposite direction also is called the "−Y direction." The Z-direction in the direction of the arrow also is called the "+Z direction," and the opposite direction also is called the "−Z direction." A member A and a member B being arranged in this order in the +X direction is referred to as "the member B being positioned at the +X side of the member A" or "the member A being positioned at the −X side of the member B." This is similar for the +Y direction and the +Z direction as well.

First, configurations of the display devices 110*a* and 110*b* will be described. The display devices 110*a* and 110*b* can have the same configuration other than having different numbers of pixels, screen sizes, etc. When it is unnecessary to differentiate in terms of configuration between the display devices 110*a* and 110*b* hereinbelow, the display devices 110*a* and 110*b* are described as the display device 110 of the same configuration. Because the display device 110*b* is arranged to have a different orientation from the display device 110*a* as shown in FIG. 1, the display device 110*a* may be referred to as the display device 110 and an XYZ coordinate system may be used in descriptions including directions.

Figure 3A:
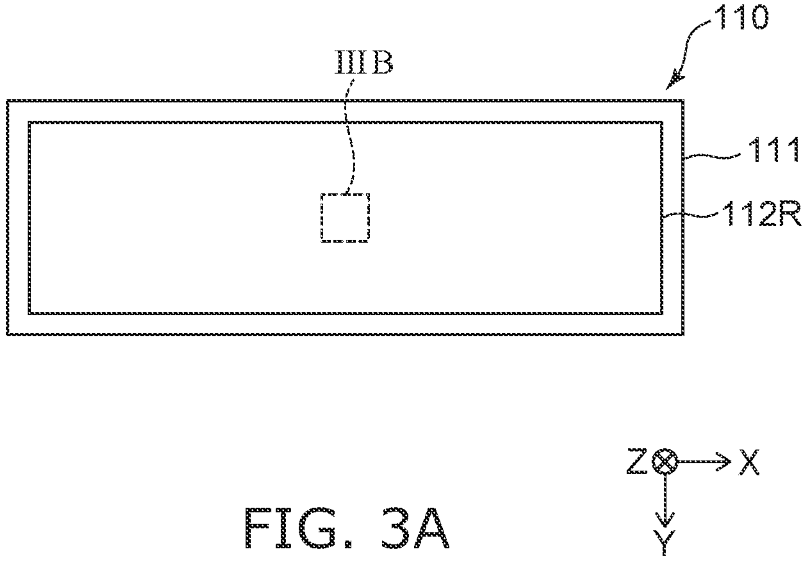
FIG. 3A is a schematic plan view illustrating a display device of the image display device according to the first embodiment.

FIG. 3A is a schematic plan view illustrating the display device of the image display device according to the first embodiment.

Figure 3B:
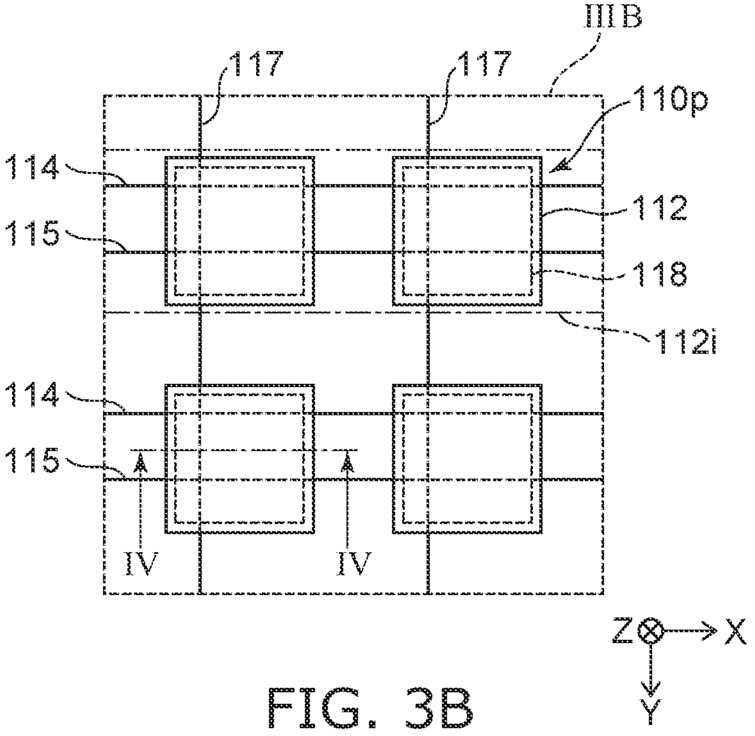
FIG. 3B is an enlarged schematic view of portion IIIB of FIG. 3A.

FIG. 3B is an enlarged schematic view of portion IIIB of FIG. 3A.

Figure 4:
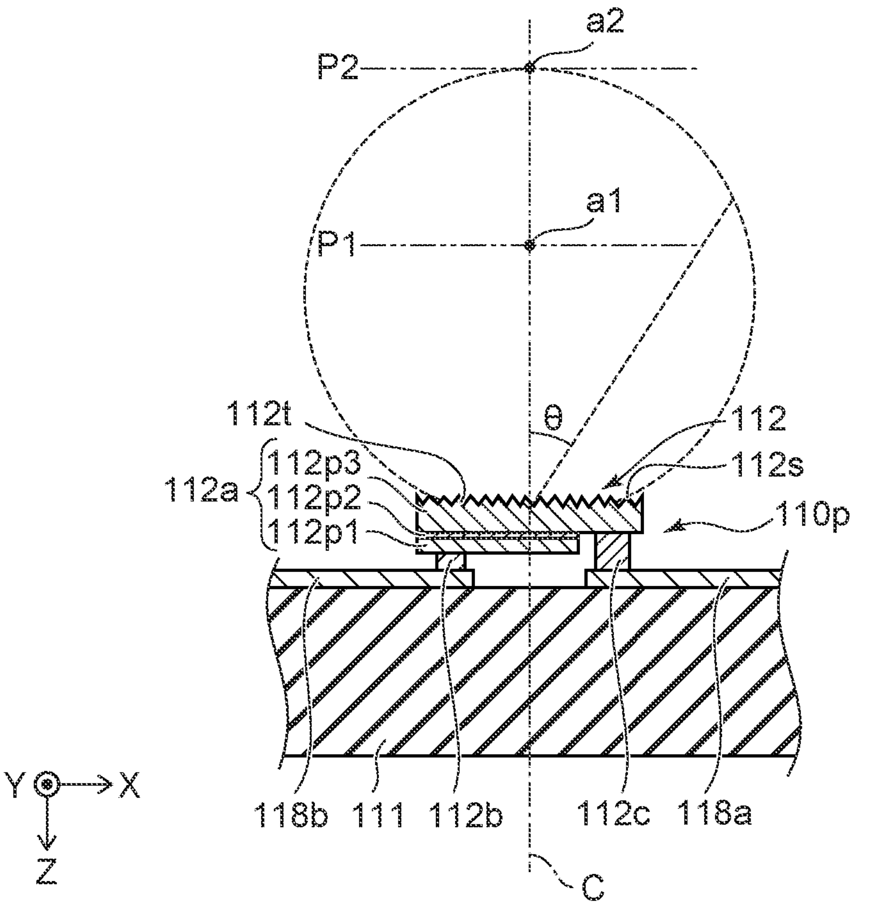
FIG. 4 is a schematic cross-sectional view along line IV-IV of FIG. 3B.

FIG. 4 is a schematic cross-sectional view along line IV-IV of FIG. 3B.

Figure 5:
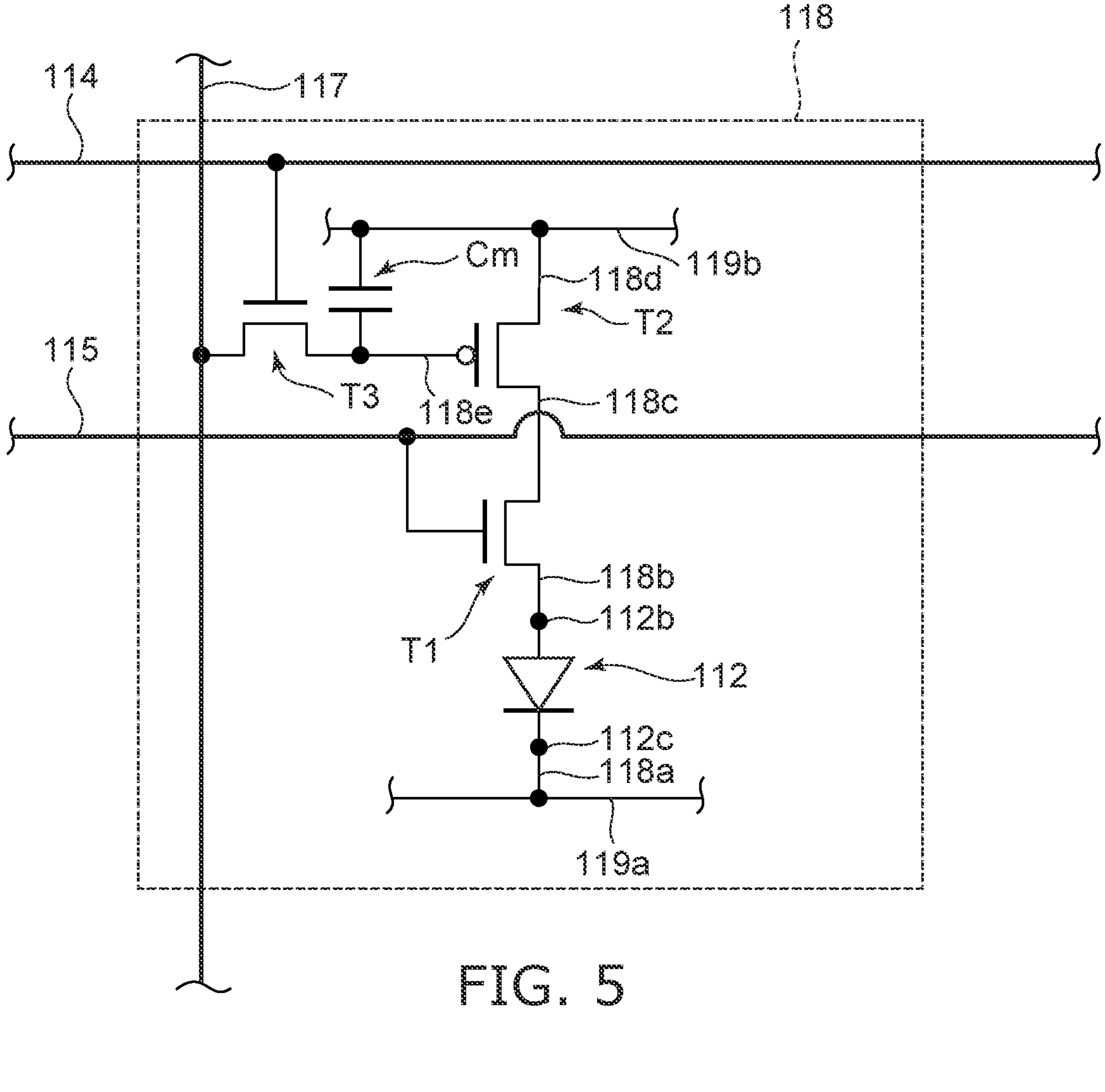
FIG. 5 is a schematic circuit diagram illustrating an individual circuit driving the pixels of FIG. 3B.

FIG. 5 is a schematic circuit diagram illustrating an individual circuit driving the pixels of FIG. 3B.

As shown in FIGS. 3A and 3B, the display device 110 includes multiple pixels 110*p*. The multiple pixels 110*p* respectively include, for example, multiple LED (Light-Emitting Diode) elements, and the display device 110 is an LED display. For example, the display device 110 is electrically connected to a controller (not illustrated) mounted in the vehicle 13, and displays an image corresponding to the state of the vehicle 13.

As shown in FIGS. 3A to 5, the display device 110 includes, for example, a substrate 111, the multiple LED elements 112, multiple scanning lines 114, multiple lighting control lines 115, multiple signal lines 117, and multiple individual circuits 118. The individual circuit 118 is simply shown as a quadrilateral in FIG. 3B.

For example, the substrate 111 has a rectangular flat plate shape. The substrate 111 can include, for example, glass, a resin such as polyimide, etc. The substrate 111 may include a semiconductor substrate of Si, etc. As shown in FIG. 3B, the multiple LED elements 112 are arranged in a matrix configuration on the substrate 111.

Hereinbelow, the multiple LED elements 112 that are arranged in one row in the X-direction are called a "row 112*i*".

As shown in FIG. 4, each LED element 112 is mounted face-down on the substrate 111. Each LED element may be mounted face-up on the substrate. Each LED element 112 includes a semiconductor stacked body 112*a*, an anode electrode 112*b*, and a cathode electrode 112*c*.

The semiconductor stacked body 112*a* includes a p-type semiconductor layer 112*p*1, an active layer 112*p*2 located on the p-type semiconductor layer 112*p*1, and an n-type semiconductor layer 112*p*3 located on the active layer 112*p*2. The semiconductor stacked body 112*a* includes, for example, a gallium nitride compound semiconductor of $In_X Al_Y Ga_{1-X-Y}N$ ($0 \leq X$, $0 \leq Y$, and $X+Y<1$). According to the embodiment, the light that is emitted by the LED element 112 is visible light.

The anode electrode 112*b* is electrically connected to the p-type semiconductor layer 112*p*1. Also, the anode electrode 112*b* is electrically connected to a wiring part 118*b* of the individual circuit 118 described below. The cathode electrode 112*c* is electrically connected to the n-type semiconductor layer 112*p*3. Also, the cathode electrode 112*c* is electrically connected to a wiring part 118*a* of the individual circuit 118. The anode electrode 112*b* and the cathode electrode 112*c* can include, for example, a metal material.

According to the embodiment, multiple recesses 112*t* are provided in a light-emitting surface 112*s* of each LED element 112. In the specification, "the light-emitting surface of the LED element" means the surface of the LED element that mainly emits the light. In the case of the display device 110*a*, the light that is emitted from the light-emitting surface 112*s* is incident on the imaging optical system 120, and in the case of the display device 110*b*, the light that is emitted from the light-emitting surface 112*s* is incident on the image-forming element 1010. According to the embodiment, the surface of the n-type semiconductor layer 112*p*3 positioned at the side opposite to the surface facing the active layer 112*p*2 corresponds to the light-emitting surface 112*s*.

Examples of methods for providing the multiple recesses 112*t* in the surface of the n-type semiconductor layer 112*p*3 positioned at the side opposite to the surface facing the active layer 112*p*2 include, for example, a method in which multiple protrusions are formed in the upper surface of a growth substrate, the n-type semiconductor layer 112*p*3, the active layer 112*p*2, and the p-type semiconductor layer 112*p*1 are grown in this order on the growth substrate, and the n-type semiconductor layer 112*p*3 and the growth substrate are detached by LLO (Laser Lift Off) or the like, a method of performing surface roughening of the surface of the n-type semiconductor layer 112*p*3 to form the multiple recesses 112*t* after detaching the growth substrate, etc. Methods of surface roughening include anisotropic etching, etc.

Hereinbelow, the optical axis of the light emitted from each pixel 110*p* is called simply an "optical axis C". As shown in FIG. 4, the optical axis C is, for example, a straight line that connects a point a1 in a first plane P1 and a point a2 in a second plane P2, wherein the first plane P1 is positioned at the light-emitting side of the display device 110 and parallel to the XY-plane in which the multiple pixels 110*p* are arranged, the luminance is a maximum at the point a1 in the range in which the light is irradiated from one pixel 110*p*, the second plane P2 is parallel to the XY-plane and separated from the first plane P1, and the luminance is a maximum at the point a2 in the range in which the light is irradiated from the pixel 110*p*. For example, if the luminance has maxima at multiple points, the center of the points may be used as the maximum luminance point. From the perspective of productivity, it is desirable for the optical axis C to be parallel to the Z-axis.

Thus, by providing the multiple recesses 112*t* in the light-emitting surface 112*s* of each LED element 112, the light that is emitted from each LED element 112, i.e., the light that is emitted from each pixel 110*p*, has a substantially Lambertian light distribution as shown by the broken-line curve in FIG. 4. Herein, "the light emitted from each pixel has a substantially Lambertian light distribution" means that the luminous intensity in the direction of an angle θ with respect to the optical axis C of each pixel has a light distribution pattern that can be approximated by $\cos^n\theta$ times the luminous intensity at the optical axis C, wherein n is a value greater than 0. Here, it is favorable for n to be not more than 11, and more favorably 1. Although many planes including the optical axis C of the light emitted from one pixel 110*p* exist, the light distribution pattern of the light emitted from the pixel 110*p* has a substantially Lambertian light distribution in each plane, and the numerical values of n are substantially equal.

The configuration of each LED element is not limited to that described above. For example, multiple protrusions instead of multiple recesses may be provided in the light-emitting surface of each LED element, or both multiple recesses and multiple protrusions may be provided. When the growth substrate is light-transmissive, the growth substrate may not be detached from the semiconductor stacked body, and multiple recesses and/or multiple protrusions may be provided in the surface of the growth substrate corresponding to the light-emitting surface. In such configurations as well, the light that is emitted from each LED element has a substantially Lambertian light distribution. Also, in each LED element, an n-type semiconductor layer may be provided to face the substrate, an active layer and a p-type semiconductor layer may be stacked in this order on the n-type semiconductor layer, and the surface of the p-type semiconductor layer at the side opposite to the surface facing the active layer may be used as the light-emitting surface of the LED element. As described in other embodiments described below, it is sufficient for the light finally emitted from each pixel to have a substantially Lambertian light distribution, and the light that is emitted from each LED element may not have a substantially Lambertian light distribution.

Although it is favorable for the display device 110*b* to have a substantially Lambertian light distribution, a substantially Lambertian light distribution is not always necessary to form the mid-air image IM3 via the image-forming element 1010. For example, in the display device 110*b*, the light-emitting surface may be a flat surface without providing multiple protrusions on the light-emitting surface, or a liquid crystal display or organic EL display can be used.

For example, the scanning lines 114, the lighting control lines 115, the signal lines 117, and the individual circuits 118 are formed by a low-temperature polysilicon (LTPS) process on the substrate 111. In the example shown in FIGS. 3A to 5, for example, the scanning circuit and the driver circuit are located in the controller. The scanning circuit drives the scanning lines 114 and the lighting control lines 115, and the driver circuit drives the signal lines 117. The scanning circuit and the driver circuit may be formed on the substrate of the display device by a LTPS process, by COB (Chip On Board), etc.

According to the embodiment, one individual circuit 118 corresponds to one LED element 112. Multiple LED elements may be located in one pixel. In such a case, one individual circuit may correspond to the multiple LED elements in the one pixel. As shown in FIG. 5, each individual circuit 118 includes a first transistor T1, a second transistor T2, a third transistor T3, a capacitor Cm, and multiple wiring parts 118*a* to 118*e*.

As shown in FIGS. 4 and 5, the cathode electrode 112*c* of the LED element 112 is electrically connected to a ground line 119*a* via the wiring part 118*a*. The ground line 119*a* is connected to a reference potential. The anode electrode 112*b* of the LED element 112 is electrically connected to the source electrode of the first transistor T1 via the wiring part 118*b*.

The gate electrode of the first transistor T1 is electrically connected to the lighting control line 115. The drain electrode of the first transistor T1 is electrically connected to the drain electrode of the second transistor T2 via a wiring part 118*c*. The source electrode of the second transistor T2 is electrically connected to a power supply line 119*b* via a wiring part 118*d*. The power supply line 119*b* is connected to a power supply (not illustrated).

The gate electrode of the second transistor T2 is electrically connected to the drain electrode of the third transistor T3 via the wiring part 118*e*. The source electrode of the third transistor T3 is electrically connected to the signal line 117. The gate electrode of the third transistor T3 is electrically connected to the scanning line 114.

The wiring part 118*e* is electrically connected to one terminal of the capacitor Cm. The other terminal of the capacitor Cm is electrically connected to the power supply line 119*b*.

One row among the multiple rows 112*i* is selected by the scanning circuit, and an on-signal is output to the scanning line 114 electrically connected to the row 112*i*. As a result, the third transistors T3 of the individual circuits 118 corresponding to the row 112*i* are in a state in which the third transistors T3 can be switched on. The driver circuit outputs, to the signal lines 117, drive signals corresponding to the setting outputs of the LED elements 112 belonging to the row 112*i*. As a result, the drive signal voltages are stored in the capacitor Cm. The drive signal voltages set the second transistors T2 of the individual circuits 118 corresponding to the row 112*i* to a state in which the second transistors T2 can be switched on.

The scanning circuit outputs, to the lighting control line 115 electrically connected to the row 112*i*, a control signal that sequentially switches the first transistors T1 of the row 112*i* on and off. When the first transistors T1 are in the on-state, the light emission luminances of the LED elements are controlled by currents corresponding to the drive signal voltages stored in the capacitors Cm flowing in the LED elements 112 belonging to the row 112*i*. The light emission periods of the LED elements 112 are controlled for each row 112*i* by switching the first transistors T1 on and off.

The scanning circuit sequentially switches, in the Y-direction, the scanning line 114 outputting the on-signal and the lighting control line 115 outputting the control signal. Accordingly, the row 112*i* that is driven is sequentially switched in the Y-direction.

The configuration of the drive circuit including the scanning circuit, the multiple scanning lines, the multiple lighting control lines, the driver circuit, the multiple signal lines, the multiple individual circuits, etc., is not limited to the configuration described above. For example, the individual circuit may include a second transistor, a third transistor, a capacitor, and wiring parts without including a first transistor; only multiple scanning lines may extend from the scanning circuit, and the lighting control line may not be included. The scanning lines, the lighting control lines, the signal lines, the wiring parts of the individual circuits, etc., may not be on the surface of the substrate, and may be provided in the substrate. The electrical elements such as the transistors, capacitors, and the like included in the drive circuit may be separately manufactured and then mounted on the substrate instead of being formed on the substrate. The LED elements may be formed on the substrate by using a semiconductor material such as silicon (Si) or the like as the substrate and by using a semiconductor element instead of being separately manufactured and then mounted on the substrate.

The configuration of the display device may not be an LED display as long as the emitted light has a substantially Lambertian light distribution. For example, the display device may be a liquid crystal display, an OLED display, or the like configured so that the emitted light has a substantially Lambertian light distribution. The display device 110*b* that irradiates light on the image-forming element 1010 and forms the mid-air image IM3 with the reflected light may not always have a substantially Lambertian light distribution as long as light having a luminance sufficient to form a clear mid-air image IM3 can be emitted.

The display device may be used as a color display by providing a wavelength conversion member such as a fluorescer layer or the like on the LED element 112.

The description continues now by returning to FIG. 1.

The imaging optical system 120 of the light source unit 11 is an optical system that includes all of the optical elements necessary for forming the real image IM1 corresponding to the first image at the prescribed position. The embodiment includes an input element 121 on which the light emitted from the display device 110*a* is incident, and an output element 123 on which the light traveling via the input element 121 is incident. The imaging optical system 120 further includes an intermediate element 122 located between the input element 121 and the output element 123. The imaging optical system may not include an intermediate element. As shown in FIG. 1, the light emitted from the output element 123 forms the real image IM1 corresponding to the first image.

The imaging optical system 120 is substantially telecentric at the side of the real image IM1 corresponding to the first image. Here, "the imaging optical system 120 is substantially telecentric at the side of the real image IM1 corresponding to the first image" means that the multiple main rays L that are emitted from mutually-different positions of the display device 110, travel via the imaging optical system 120, and reach the real image IM1 corresponding to the first image are substantially parallel to each other before and after the real image IM1 corresponding to the first image as shown in FIG. 1. "Different positions" refers to, for example, different pixels 110*p*. "The multiple main rays L being substantially parallel to each other" means being substantially parallel in a practical range that permits errors such as the manufacturing accuracy, assembly accuracy, etc., of the components of the light source unit 11. When "the multiple main rays L are substantially parallel to each other", for example, the angle between the main rays L is not more than 10°.

When the imaging optical system 120 is substantially telecentric at the side of the real image IM1 corresponding to the first image, the multiple main rays L cross each other before being incident on the input element 121. Hereinbelow, the point at which the multiple main rays L cross each other is called a "focal point F". Therefore, for example, whether or not the imaging optical system 120 is substantially telecentric at the side of the real image IM1 corresponding to the first image can be confirmed by utilizing the backward propagation of light by the following method. First, a light source that can emit parallel light such as a laser light source or the like is located at the vicinity of the position at which the real image IM1 corresponding to the first image is formed. The light that is emitted from the light source is irradiated on the output element 123 of the imaging optical system 120. The light that is emitted from the light source and travels via the output element 123 is incident on the input element 121. Then, if the light that is emitted from the input element 121 condenses at a point, i.e., the focal point F, before reaching the display device 110, then the imaging optical system 120 can be determined to be substantially telecentric at the side of the real image IM1 corresponding to the first image.

Because the imaging optical system 120 is substantially telecentric at the side of the real image IM1 corresponding to the first image, the light emitted from each pixel 110*p* that is mainly incident on the imaging optical system 120 is the light that passes through the focal point F and the vicinity of the focal point F. Optical elements included in the imaging optical system 120 will now be described.

The input element 121 is positioned at the −Z side of the display device 110 and arranged to face the display device 110. The input element 121 is a mirror that includes a concave mirror surface 121*a*. The input element 121 reflects the light emitted from the display device 110.

The intermediate element 122 is positioned at the −X side of the display device 110 and the input element 121 and arranged to face the input element 121. The intermediate element 122 is a mirror that includes a concave mirror surface 122*a*. The intermediate element 122 further reflects the light reflected by the input element 121.

The input element 121 and the intermediate element 122 are included in a bending part 120*a* that bends the multiple main rays L so that the multiple main rays L emitted from mutually-different positions of the display device 110 are substantially parallel to each other. According to the embodiment, the mirror surfaces 121*a* and 122*a* are biconic surfaces. However, the mirror surfaces may be portions of spherical surfaces or may be freeform surfaces.

The output element 123 is positioned at the +X side of the display device 110 and the input element 121 and arranged to face the intermediate element 122. The output element 123 is a mirror that includes a flat mirror surface 123*a*. The output element 123 reflects the light traveling via the input element 121 and the intermediate element 122 toward the formation position of the real image IM1 corresponding to the first image.

Specifically, the multiple main rays L that are substantially parallel due to the bending part 120*a* are incident on the output element 123. The mirror surface 123*a* is tilted in the −Z/+X direction with respect to the XY-plane, i.e., the horizontal plane of the vehicle 13. As a result, the light that is reflected by the intermediate element 122 is reflected by the output element 123 in a direction tilted in the −Z/+X direction with respect to the Z-direction. Thus, as shown in FIG. 1, the output element 123 is included in a direction modifying part 120*b* that modifies the directions of the multiple main rays L so that the multiple main rays L caused to be substantially parallel by the bending part 120*a* are directed toward a position P at which the real image IM1 corresponding to the first image is formed.

According to the embodiment, the optical path between the input element 121 and the intermediate element 122 extends in a direction crossing the XY-plane. The optical path between the intermediate element 122 and the output element 123 extends in a direction along the XY-plane. Because a portion of the optical path inside the imaging optical system 120 extends in a direction crossing the XY-plane, the light source unit 11 can be somewhat smaller in directions along the XY-plane. Also, because another portion of the optical path inside the imaging optical system 120 extends in a direction along the XY-plane, the light source unit 11 can be somewhat smaller in the Z-direction.

The optical path between the display device 110 and the input element 121 crosses the optical path between the intermediate element 122 and the output element 123. Thus, by causing the optical paths to cross each other inside the light source unit 11, the light source unit 11 can be smaller.

The optical paths inside the light source unit are not limited to those described above. For example, all of the optical paths inside the imaging optical system may extend in directions along the XY-plane or may extend in directions crossing the XY-plane. The optical paths inside the light source unit may not cross each other.

The input element 121, the intermediate element 122, and the output element 123 each may include a main member made of glass, a resin material, or the like and a reflective film such as a metal film, a dielectric multilayer film, or the like forming the mirror surfaces 121*a*, 122*a*, and 123*a* located at the surface of the main member. The input element 121, the intermediate element 122, and the output element 123 each may be entirely formed of a metal material.

According to the embodiment as shown in FIG. 1, the light source unit 11 is located at a ceiling part 13*b* of the vehicle 13. For example, the light source unit 11 is located at the inner side of a wall 13*s*1 of the ceiling part 13*b* exposed inside the vehicle. A through-hole 13*h*1 through which the light emitted from the output element 123 of the light source unit 11 can pass is provided in the wall 13*s*1. The light that is emitted from the output element 123 passes through the through-hole 13*h*1 and is irradiated on the space between the user 14 and the front windshield 13*a*. The light source unit may be mounted to the ceiling surface. A transparent or semi-transparent cover may be located in the through-hole 13*h*1. It is favorable for the haze value of the cover of the through-hole 13*h*1 to be not more than 50%, and more favorably not more than 20%.

Although the imaging optical system 120 is described above, the configuration and position of the coupling optical system are not limited to those described above as long as the coupling optical system is substantially telecentric at the side of the real image IM1 corresponding to the first image. For example, the number of optical elements included in the direction modifying part may be two or more.

The reflection unit 12 will now be described.

According to the embodiment, the reflection unit 12 includes a mirror 131 that includes a concave mirror surface 131*a*. According to the embodiment, the mirror surface 131*a* is a biconic surface. However, the mirror surface may be a portion of a spherical surface or may be a freeform surface. As shown in FIG. 1, the mirror 131 is arranged to face the front windshield 13*a*. The mirror 131 reflects the light emitted from the output element 123 and irradiates the light on the front windshield 13*a*. The light that is irradiated on the front windshield 13*a* is reflected by the inner surface of the front windshield 13*a* and enters the eyebox 14*a* of the user 14. As a result, the user 14 views the virtual image IM2 corresponding to the first image displayed by the display device 110 at the +X side of the front windshield 13*a*.

The mirror 131 may include a main member made of glass, a resin material, or the like and a reflective film such as a metal film, a dielectric multilayer film, or the like forming the mirror surface 131*a* located at the surface of the main member. The mirror 131 may be entirely formed of a metal material. The mirror 131 is a so-called half mirror. The light from the mirror surface 131*a* side is reflected by the mirror surface 131*a*, and the light from the side opposite to the mirror surface 131*a* side is transmitted by the mirror surface 131*a* side.

According to the embodiment, the reflection unit 12 is located at a dashboard part 13*c* of the vehicle 13. For example, the reflection unit 12 is located at the inner side of a wall 13*s*2 of the dashboard part 13*c* of the vehicle 13 exposed inside the vehicle. A through-hole 13*h*2 through which the light emitted from the output element 123 of the light source unit 11 can pass is provided in the wall 13*s*2. The light that is emitted from the output element 123 passes through the through-hole 13*h*1, forms the real image IM1 corresponding to the first image, subsequently passes through the through-hole 13*h*2, and is irradiated on the reflection unit 12. The reflection unit may be mounted to the upper surface of the dashboard part. The reflection unit may be located at the ceiling part, and the light source unit may be located at the dashboard part.

As shown in FIG. 1, the light that travels from the inner surface of the front windshield 13*a* toward the eyebox 14*a* is positioned at the XY-plane. Here, "the light that travels from the inner surface of the front windshield 13*a* toward the eyebox 14*a* is positioned at the XY-plane" means that a portion of the light traveling from the inner surface of the front windshield 13*a* toward the eyebox 14*a* is positioned at the XY-plane. With this XY-plane as a boundary, the light source unit 11 is located in a region at the +Z side. In other words, the light source unit 11 is separated in the +Z direction from the XY-plane. Also, with the plane XY as a boundary, the reflection unit 12 is located in a region at the −Z side. In other words, the reflection unit 12 is separated in the −Z direction from the XY-plane. The arrangement of the light source unit and the reflection unit is not limited to that described above.

Thus, the configuration and position of the reflection unit are not limited to those described above for the reflection unit 12. For example, the number of optical elements such as mirrors and the like included in the reflection unit may be two or more. It goes without saying that the reflection unit 12 must be arranged so that, for example, sunlight that is irradiated from outside the vehicle via the front windshield 13*a* is not reflected toward the eyebox 14*a*.

The image-forming element 1010 will now be described.

Figure 6:
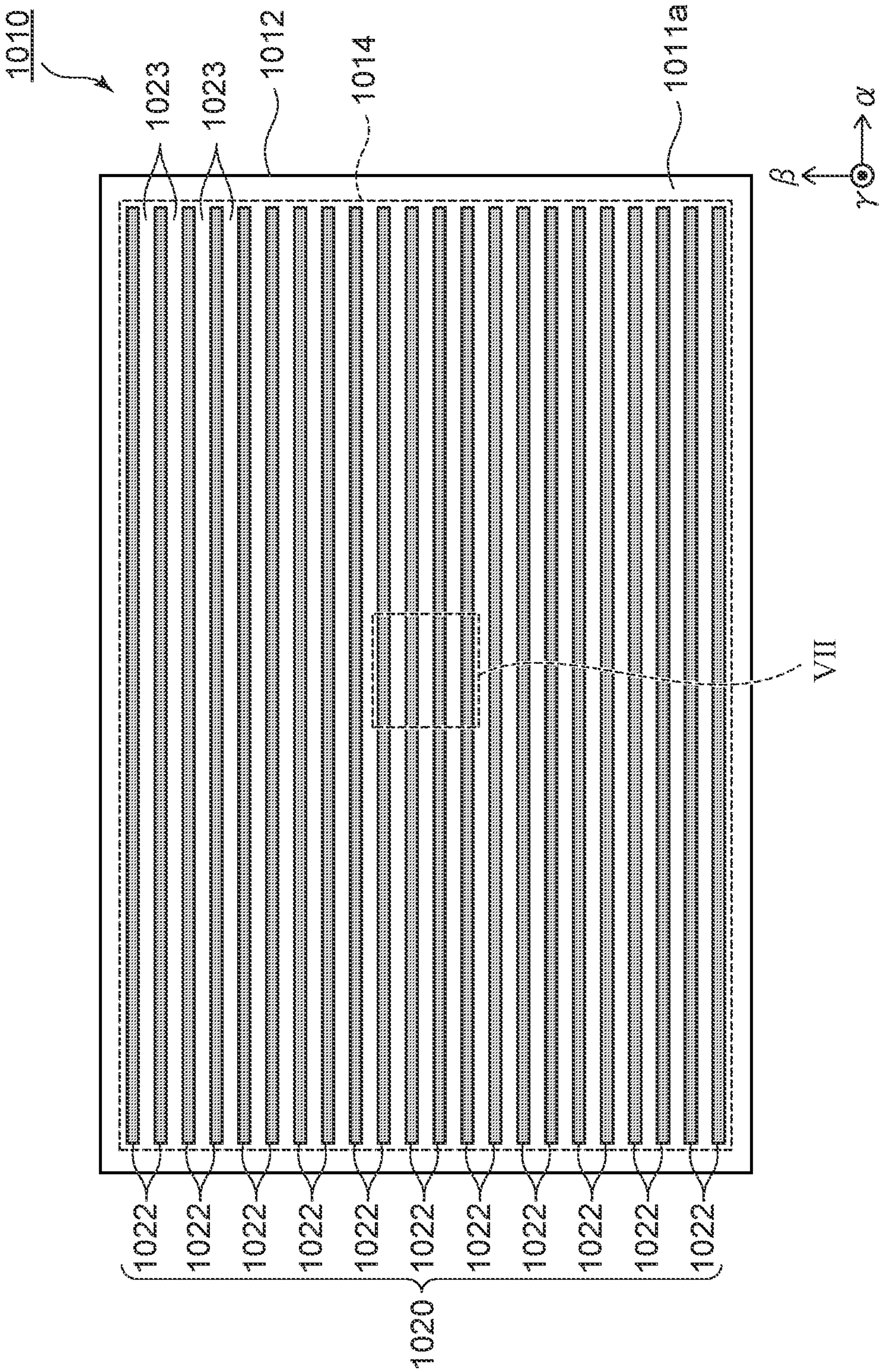
FIG. 6 is a schematic plan view illustrating an image-forming element of the image display device according to the first embodiment.

FIG. 6 is a schematic plan view illustrating the image-forming element of the image display device according to the first embodiment.

Figure 7:
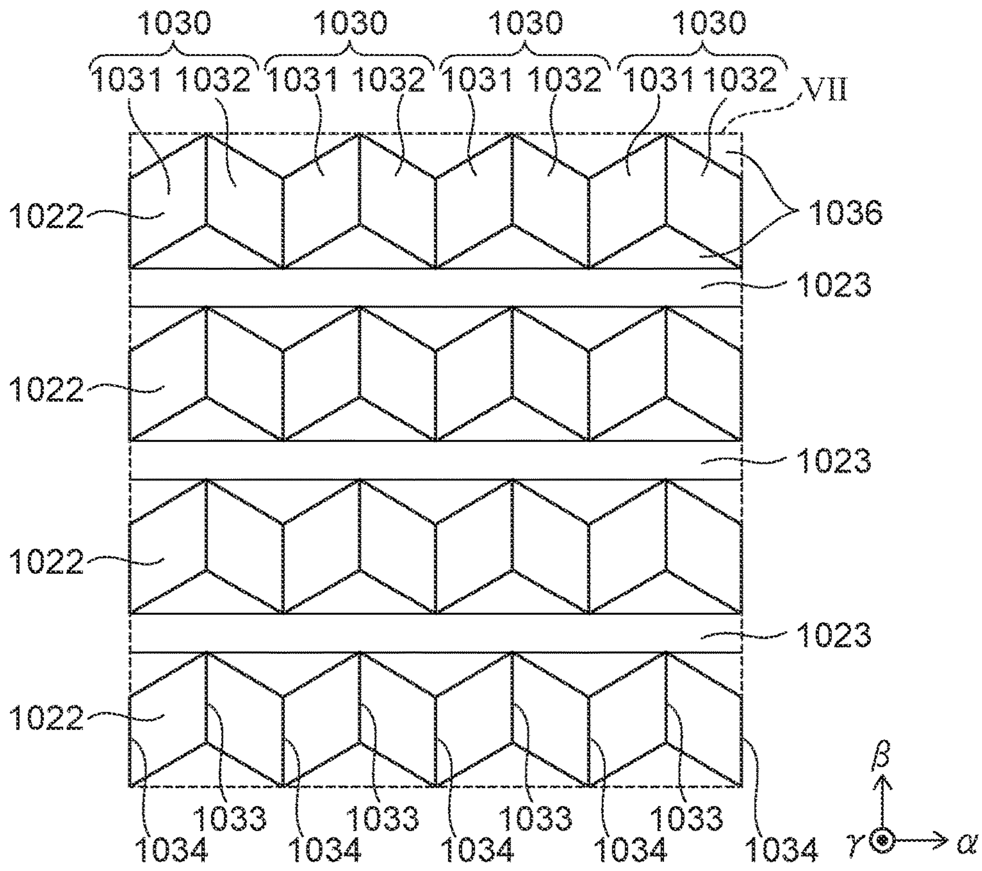
FIG. 7 is an enlarged schematic view of portion VII of FIG. 6.

FIG. 7 is an enlarged schematic view of portion VII of FIG. 6.

Figure 8:
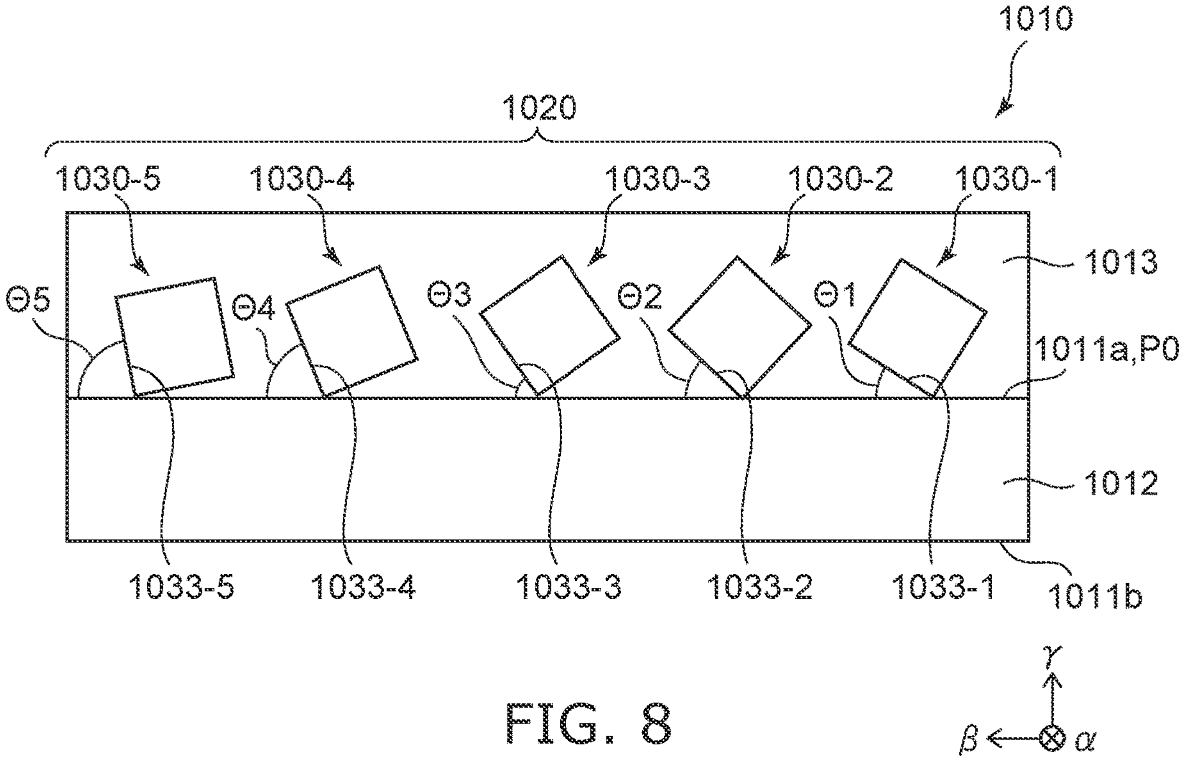
FIG. 8 is a schematic side view illustrating an image-forming element of the image display device according to the first embodiment.

FIG. 8 is a schematic side view illustrating the image-forming element of the image display device according to the first embodiment.

In the description of the configuration of the image-forming element 1010, an orthogonal coordinate system made of an α-axis, a β-axis, and a γ-axis may be used separately from the XYZ orthogonal coordinate system described above. The αβ-plane that includes the α-axis and the β-axis is taken as a plane parallel to a first surface 1011*a* of a base member 1012 shown in FIG. 8. The α-axis is parallel to the direction in which a reflector row 1022 shown in FIG. 6 extends. The β-axis is orthogonal to the α-axis and parallel to the direction in which the multiple reflector rows 1022 are arranged. The γ-axis is orthogonal to the α-axis and the β-axis. The direction from a second surface 1011*b* toward the first surface 1011*a* of the base member 1012 is taken as the positive direction of the γ-axis. The second surface 1011*b* is at the side opposite to the first surface 1011*a*.

The positive direction of the α-axis is called the "+α direction," and the negative direction of the α-axis is called the "−α direction." The positive direction of the β-axis is called the "+β direction," and the negative direction of the β-axis is called the "−β direction." The positive direction of the γ-axis is called the "+γ direction," and the negative direction of the γ-axis is called the "−γ direction." Simply "in a plan view" may be used when viewing a plane parallel to the αβ-plane from the +γ direction or the −γ direction.

As shown in FIG. 6, the image-forming element 1010 includes the base member 1012 and a reflector array 1020.

The reflector array 1020 is located at the first surface 1011*a* of the base member 1012. In the example, the reflector array 1020 is located in a reflector formation region 1014 of the first surface 1011*a*. The reflector array 1020 includes the multiple reflector rows 1022. The reflector array 1020 may be provided in the base member 1012. That is, the reflector array 1020 and the base member 1012 may be formed as a continuous body. In such a case, the first surface 1011*a* or the back surface of the base member 1012 is used as the dihedral corner reflector of the reflector array 1020 described below.

The reflector row 1022 extends along the α-direction. The multiple reflector rows 1022 are arranged to be substantially parallel to each other along the β-direction. The adjacent reflector rows 1022 among the multiple reflector rows 1022 are arranged at substantially uniform spacing with a spacing 1023 interposed in the β-axis direction. The length in the β-direction of the spacing 1023 can be any length and can be, for example, about the length of the reflector row 1022 in the β-direction.

When the light source is located at the first surface 1011*a* side, light rays that are not reflected by the reflector row 1022, reflected light that is reflected only once by the reflector row 1022, etc., are incident on the region at which the spacing 1023 is formed. Because such light rays do not contribute to the floating image formation, the ratio of light rays incident on the image-forming element 1010 that contribute to the floating image formation is reduced by widening the spacing 1023. Therefore, the length in the β-direction of the spacing 1023 is set to an appropriate length according to the dimensions of the dihedral corner reflector, the efficiency of the reflecting surface, etc. Each of the reflector rows 1022 includes many dihedral corner reflectors 1030 connected in the α-direction as described with reference to FIG. 7, and is therefore shown as filled-in to avoid complexity of illustration in FIG. 6.

As described below in the description of the operation of the image-forming element 1010, according to the operation of the image-forming element 1010, there are cases where it is necessary to provide spacing and cases where spacing may not be provided between the two adjacent reflector rows 1022. It is necessary to provide the spacing 1023 in the case of an operation in which the display device 110*b* emits the light toward the image-forming element 1010 from substantially directly above the image-forming element 1010 at the first surface 1011*a* side, and the image-forming element 1010 emits the reflected light obliquely upward. Spacing may not be provided when the display device 110*b* emits light toward the image-forming element 1010 from obliquely above the image-forming element 1010, and the image-forming element 1010 emits the reflected light substantially directly above the image-forming element 1010. Here, the emission of light from substantially directly above the image-forming element 1010 refers to the emission of light from the first surface 1011*a* side in a direction substantially perpendicular to the first surface 1011*a* and a virtual plane P0 from the +γ direction toward the −γ direction. The emission of the light obliquely above the image-forming element 1010 refers to the emission of light from the first surface 1011*a* side in the +β direction or the −β direction at an angle from the normal direction which is substantially perpendicular to the first surface 1011*a* and the virtual plane P0.

As shown in FIG. 7, the reflector row 1022 includes the multiple dihedral corner reflectors 1030. The multiple dihedral corner reflectors 1030 are arranged along the α-direction and connected to each other. The dihedral corner reflector 1030 includes a first reflecting surface 1031 and a second reflecting surface 1032. The dihedral corner reflector 1030 is located on a base part 1036 formed on the first surface 1011*a*. The first reflecting surface 1031 and the second reflecting surface 1032 each are substantially square when viewed in front-view. The first reflecting surface 1031 and the second reflecting surface 1032 are connected to be substantially orthogonal at one side each of a square.

The connecting line between the first reflecting surface 1031 and the second reflecting surface 1032 of the dihedral corner reflector 1030 is called a valley-side connecting line (a straight line) 1033. The side of the first reflecting surface 1031 positioned at the side opposite to the valley-side connecting line 1033 and the side of the second reflecting surface 1032 positioned at the side opposite to the valley-side connecting line 1033 each are called hill-side connecting lines 1034.

The first reflecting surface 1031 of the dihedral corner reflector 1030 is connected at the hill-side connecting line 1034 to the second reflecting surface 1032 of the dihedral corner reflector 1030 adjacent at the −α direction side. The second reflecting surface 1032 of the dihedral corner reflector 1030 is connected at the hill-side connecting line 1034 to the first reflecting surface 1031 of another dihedral corner reflector 1030 adjacent at the +α direction side. Thus, the multiple dihedral corner reflectors 1030 are connected to each other along the α-direction and are provided continuously.

The reflector rows 1022 that are adjacent to each other in the β-direction are arranged so that the positions in the α-direction of the valley-side connecting line 1033 and the hill-side connecting line 1034 are respectively the same. This arrangement is not limited thereto; the positions in the α-direction of the valley-side connecting line 1033 and the hill-side connecting line 1034 may be shifted for each reflector row 1022 between the reflector rows 1022 adjacent to each other in the β-direction.

In the image-forming element 1010, the virtual plane P0 is defined as described below with reference to FIG. 8. The virtual plane P0 is the reference plane for the angle when the dihedral corner reflector 1030 is mounted to the base member 1012. The angle at which the dihedral corner reflector 1030 is mounted to the base member 1012 is defined as the angle of the valley-side connecting line 1033 with respect to the virtual plane P0. The virtual plane P0 is defined as a plane including the α-axis and the β-axis; according to the embodiment, the virtual plane P0 is parallel to the first surface 1011*a*.

According to the embodiment, the first surface 1011*a* is parallel to the virtual plane P0 because the reflector array 1020 of the image-forming element 1010 is located at the first surface 1011*a* which is a plane. The surface at which the reflector array is formed is not limited to a plane and may be a curved surface; when the reflector array is formed at a curved surface, the virtual plane P0 is the reference plane for defining the angle of the valley-side connecting line 1033.

FIG. 8 is an enlarged schematic illustration of five dihedral corner reflectors 1030-1 to 1030-5 among many dihedral corner reflectors arranged in the β-direction. Although the reference numerals of the dihedral corner reflectors are different to differentiate the positions of the dihedral corner reflectors in the β-direction, the configurations are the same as the configuration of the dihedral corner reflector 1030 described with reference to FIG. 7. The base part 1036 shown in FIG. 7 is not illustrated to avoid complexity of illustration.

When the interior angle between the virtual plane P0 and the valley-side connecting line is called the mounting angle of the dihedral corner reflector, the mounting angles of the dihedral corner reflectors 1030-1 to 1030-5 each are defined as follows. Namely, a mounting angle Θ1 of the dihedral corner reflector 1030-1 is the interior angle between the virtual plane P0 and a valley-side connecting line 1033-1. A mounting angle Θ2 of the dihedral corner reflector 1030-2 is the interior angle between the virtual plane P0 and a valley-side connecting line 1033-2. A mounting angle Θ3 of a dihedral corner reflector 1030-3 is the interior angle between the virtual plane P0 and a valley-side connecting line 1033-3. A mounting angle Θ4 of the dihedral corner reflector 1030-4 is the interior angle between the virtual plane P0 and a valley-side connecting line 1033-4. A mounting angle Θ5 of the dihedral corner reflector 1030-5 is the interior angle between the virtual plane P0 and a valley-side connecting line 1033-5.

The mounting angle of the dihedral corner reflector is greater than 0° and less than 90°. Because the first reflecting surface 1031 and the second reflecting surface 1032 shown in FIG. 7 are orthogonal to each other, the angle between the first reflecting surface 1031 and the virtual plane P0 is greater than 0° and less than 45°. Similarly, the angle between the second reflecting surface 1032 and the virtual plane P0 is greater than 0° and less than 45°.

When referenced to the mounting angle of the dihedral corner reflector of one reflector row among the multiple reflector rows, the mounting angles of the dihedral corner reflectors of the remaining reflector rows increase in the +β direction away from the reflector row including the dihedral corner reflector having the reference mounting angle. In the example of FIG. 8, the magnitudes of the mounting angles Θ1 to Θ5 are Θ1<Θ2<Θ3<Θ4<Θ5.

As shown in FIG. 8, the image-forming element 1010 further includes a protective layer 1013. The protective layer 1013 is provided to cover the reflector array 1020 and the first surface 1011*a*. The protective layer 1013 includes a highly light-transmitting material so that the transmitted amount of the light incident on the image-forming element 1010 via the protective layer 1013 is substantially constant. It is favorable for the surface of the protective layer 1013 to be flat enough that the refraction angle of the incident light is substantially constant.

An operation of the image-forming element 1010 will now be described.

In the image-forming element 1010, a portion of the light incident on the first reflecting surface 1031 of the dihedral corner reflector 1030 is reflected and is incident on the second reflecting surface 1032 as once-reflected light. The second reflecting surface 1032 reflects a portion of the incident once-reflected light and emits the portion as twice-reflected light. Also, a portion of the light incident on the second reflecting surface 1032 is reflected and is incident on the first reflecting surface 1031 as once-reflected light. The first reflecting surface 1031 reflects a portion of the incident once-reflected light and emits the portion as reflected light of the image-forming element 1010. The twice-reflected light that is reflected twice by the two reflecting surfaces of the dihedral corner reflector 1030 forms a real image in mid-air at the first surface 1011*a* side.

When the image-forming element 1010 includes the spacing 1023, light that is not reflected by the dihedral corner reflector 1030 even once escapes to the second surface 1011*b* side via the spacing 1023. When the spacing 1023 is not included in the image-forming element 1010, and when there are, for example, other light-transmitting parts such as the base part 1036, etc., the light escapes to the second surface 1011*b* side via such parts. The light that escapes to the second surface 1011*b* side has no contribution to the floating image formation at the first surface 1011*a* side.

A portion of the once-reflected light that is not reflected a second time is emitted from the image-forming element 1010 via different paths according to the position of the display device 110*b*. When the display device 110*b* emits the light from directly above the image-forming element 1010, the once-reflected light that is not reflected a second time escapes to the second surface 1011*b* side via the spacing 1023. Therefore, the once-reflected light that is not reflected a second time has no contribution to the floating image formation at the first surface 1011*a* side.

When the display device 110*b* emits the light from obliquely above the image-forming element 1010 toward the image-forming element 1010, the once-reflected light reflected by the first reflecting surface 1031 once but not reflected by the second reflecting surface 1032 is emitted toward the first surface 1011*a* side as-is. The once-reflected light that is emitted toward the first surface 1011*a* side does not form a real image, but may form a ghost image.

As described above, when the display device 110*b* is located directly above the image-forming element 1010 and a mid-air image is formed obliquely above the image-forming element 1010, the formation of the ghost image can be prevented by providing the spacing 1023 between the adjacent reflector rows 1022.

When the display device 110*b* is located obliquely above the image-forming element 1010 and the mid-air image is formed directly above the image-forming element 1010, the spacing 1023 may or may not be provided between the adjacent reflector rows 1022. When the spacing 1023 is not provided, the adjacent reflector rows 1022 can be arranged in close contact.

In any case, the location of the display device 110*b* and the location of the image-forming element 1010 are appropriately set according to the mounting conditions of the image display device. Then, the mid-air image is formed at the desired position by appropriately setting the position at which the image-forming element 1010 is located, the angle at which the image-forming element 1010 reflects the light, the mounting angle of the dihedral corner reflector 1030 of the image-forming element 1010, etc.

Returning now to FIG. 1, a specific example of the configurations of the display device 110*b* and the image-forming element 1010 forming the mid-air image IM3 will be described.

As shown in FIG. 1, for example, the display device 110*b* and the image-forming element 1010 are located in the dashboard part 13*c* together with the reflection unit 12. Inside the dashboard part 13*c*, the display device 110*b* is arranged in the +X direction of the image-forming element 1010, and is arranged to emit the light LL toward the image-forming element arranged in the −X direction. The display device 110*b* emits the light LL substantially parallel to the X-axis. The image-forming element 1010 is arranged in the −Z direction of the mirror 131. The image-forming element 1010 is arranged to emit the reflected light LR in the +X direction and +Z direction.

In the example of FIG. 1, when viewed from the image-forming element 1010, the display device 110*b* is located obliquely above the image-forming element 1010. The display device 110*b* emits the light LL toward the image-forming element 1010 from obliquely above the image-forming element 1010. The image-forming element 1010 emits the reflected light LR directly above the image-forming element 1010. The reflected light LR that is emitted from the image-forming element 1010 forms the mid-air image IM3 directly above the image-forming element 1010.

In the example of FIG. 1, the mid-air image IM3 is formed between the user 14 and the inner surface of the front windshield 13*a*. The mid-air image IM3 can be formed in the optical path between the eyebox 14*a* and the virtual image IM2 formed by the light source unit 11 and the reflection unit 12. Thus, by forming the mid-air image IM3, the user 14 can simultaneously view the virtual image IM2 and the mid-air image IM3.

A configuration of the image display device 10A according to a modification shown in FIG. 2 will now be described.

The configuration of the light source unit 11 of the image display device 10A is similar to that of the first embodiment, and a detailed description is omitted. The reflection unit 22 is located at the dashboard part 13*c* of the vehicle 13. The reflection unit 22 includes the mirror 322. Similar to the mirror 131 shown in FIG. 1, the mirror 322 is a half mirror. The mirror 322 reflects light from the mirror surface 322*a* side and transmits, to the mirror surface 322*a* side, light through the surface positioned at the side opposite to the mirror surface 322*a*. The mirror surface 322*a* of the mirror 322 is, for example, a concave surface. The mirror surface 322*a* is arranged at a position and angle to face the eyebox 14*a* of the user 14 when the user 14 is in the driver's seat of the vehicle 13. For example, the mirror surface 322*a* faces obliquely upward. That is, the mirror surface 322*a* faces a direction between the −X direction and the +Z direction. The angle of the mirror surface 322*a* can be finely adjusted according to the position of the eyebox 14*a* of the user 14.

Operations of the light source unit 11 and the reflection unit 22 will now be described.

Main rays L8 that are emitted from the light source unit 11 travel in a direction between the +X direction and the −Z direction, are reflected by the mirror surface 322*a* of the mirror 322 of the reflection unit 22, travel in a direction between the −X direction (the back side of the vehicle) and the +Z direction (the upper side of the vehicle), and enter the eyebox 14*a* of the user 14. The paths of the main rays L8 from the light source unit 11 toward the reflection unit 12 are positioned inward of the front windshield 13*a* of the vehicle 13 and are substantially along the front windshield 13*a*. The main rays L8 form the real image IM1 corresponding to the first image at the position P between the light source unit 11 and the reflection unit 22.

As a result, as shown in FIG. 2, the user 14 can view the virtual image IM2 depthward of the mirror surface 322*a* of the dashboard part 13*c*. For example, the virtual image IM2 is formed 3 m beyond the mirror surface 322*a*. Therefore, the user 14 can view the virtual image IM2 without greatly changing the focal length of the eyes when viewing distant scenery via the front windshield 13*a*.

In the example of FIG. 2, the display device 110*b* and the image-forming element 1010 of the image display device 10A are located in the dashboard part 13*c* together with the reflection unit 22. The display device 110*b* is arranged to emit the light LL toward the image-forming element 1010. The image-forming element 1010 is located further in the +X direction than the mirror 322. The image-forming element 1010 is arranged to emit the reflected light LR in the normal direction.

The display device 110*b* is located directly above the image-forming element 1010 when viewed from the image-forming element 1010. The display device 110*b* emits the light LL toward the image-forming element 1010 from directly above the image-forming element 1010. The image-forming element 1010 emits the reflected light LR obliquely above the image-forming element 1010. The reflected light LR that is emitted from the image-forming element 1010 forms the mid-air image IM3 obliquely above the image-forming element 1010.

In the image-forming element 1010 in the example of FIG. 2, the formation of a ghost image other than the real image used to form the mid-air image IM3 can be suppressed by providing the spacing 1023 between the two adjacent reflector rows 1022.

By appropriately setting the emergence angle and the like of the light LL of the display device 110*b*, the user 14 can view the virtual image IM2 and the mid-air image IM3 at the position of the same eyebox 14*a* without shielding the optical path formed between the eyebox 14*a* and the virtual image IM2.

Effects of the image display device 10 according to the embodiment and the image display device 10A according to the modification will now be described.

In the image display device 10 according to the embodiment and the image display device 10A according to the modification, the imaging optical system 120 is substantially telecentric at the side of the real image IM1 corresponding to the first image, and the light that is emitted from the display device 110 has a substantially Lambertian light distribution. Therefore, the quality of the real image IM1 corresponding to the first image can be improved while downscaling the light source unit 11. More specifically, the dependence on the angle of the luminous intensity and/or chromaticity of the light emitted from each pixel 110*p* of the display device 110 can be reduced because the light emitted from the display device 110 has a substantially Lambertian light distribution.

As an exact Lambertian light distribution is approached, that is, as the approximation formula of the light distribution pattern approaches $\cos^n\Xi$ in which n is 1, the luminous intensity and/or chromaticity of the light emitted from the pixels 110*p* of the display device 110 is substantially uniform regardless of the angle. Therefore, the fluctuation of the luminance and/or chromaticity of the real image IM1 corresponding to the first image can be suppressed, and the quality of the real image IM1 corresponding to the first image can be improved.

Because the imaging optical system 120 forms the real image IM1 corresponding to the first image mainly with light passing through the focal point F, an increase of the light diameter of the light incident on the imaging optical system 120 can be suppressed. The input element 121 can be smaller thereby. Furthermore, the multiple main rays L that are emitted from the output element 123 are substantially parallel to each other. The multiple main rays L emitted from the output element 123 being substantially parallel to each other means that the range in which the light of the output element 123 contributing to the floating image formation is irradiated is substantially the same as the size of the real image IM1 corresponding to the first image. Therefore, the output element 123 of the imaging optical system 120 also can be smaller. Thus, the light source unit 11 that is small and can form a high-quality real image IM1 corresponding to the first image can be provided.

The image display devices 10 and 10A include the light source unit 11, and the reflection units 12 and 22 that are separated from the light source unit 11 and reflect the light emitted from the imaging optical system 120. The real image IM1 that corresponds to the first image is formed between the light source unit 11 and the reflection units 12 and 22. In such a case, the light that is emitted from one point of the display device 110 travels via the output element 123 and then is condensed at the formation position of the real image IM1 corresponding to the first image. On the other hand, when the real image IM1 that corresponds to the first image is not formed between the light source unit 11 and the reflection unit 12, the light diameter of the light emitted from one point of the display device 110 gradually spreads from the input element 121 toward the reflection unit 12. Accordingly, according to the embodiment, the irradiation area on the output element 123 of the light emitted from the one point of the display device 110 can be less than when the real image IM1 corresponding to the first image is not formed. Therefore, the output element 123 can be smaller.

Because the light source unit 11 according to the embodiment is small, the light source unit 11 can be easily located in the limited space inside the vehicle 13 when the light source unit 11 is mounted in the vehicle 13 and used as a head-up display.

The image display devices 10 and 10A according to the embodiment include the display device 110*b* and the image-forming element 1010. The image-forming element 1010 can reflect the light LL emitted from the display device 110*b*, and the mid-air image IM3 can be formed in mid-air by the reflected light LR. The mid-air image IM3 is formed at the desired position by appropriately setting the arrangement of the display device 110*b* and the image-forming element 1010 and the angle and distance at which the light is emitted.

The formation position of the mid-air image IM3 can be set so that the user 14 can view the mid-air image IM3 at the position of the eyebox 14*a* viewing the virtual image IM2. By such a setting, the user 14 can simultaneously view the virtual image IM2 and the mid-air image IM3.

The display devices 110*a* and 110*b* can display mutually-different images. The display devices 110*a* and 110*b* also can independently switch between a display and a non-display. For example, the reflection units 12 and 22 and the light source unit 11 including the display device 110*a* function as a HUD and display the virtual image IM2 corresponding to an image generated by a car navigation system. The virtual image IM2 is constantly displayed when the user 14 drives the vehicle 13. On the other hand, the display device 110*b* and the image-forming element 1010 form the mid-air display, for example, in front of the virtual image IM2 as needed by the user 14, as needed by the car navigation system, etc. Thus, by displaying when necessary, the mid-air image IM3 can draw the attention of the user 14, and a more effective display system can be made.

According to the embodiment, the imaging optical system 120 includes the bending part 120*a* and the direction modifying part 120*b*. Thus, the design of the imaging optical system 120 is easier because the part of the imaging optical system 120 having the function of making the main rays L parallel to each other and the part of the imaging optical system 120 forming the real image IM1 corresponding to the first image at the desired position are separate.

A portion of the optical path inside the imaging optical system 120 extends in a direction crossing the XY-plane orthogonal to the Z-direction. Therefore, the imaging optical system 120 can be somewhat smaller in directions along the XY-plane.

Another portion of the optical path inside the imaging optical system 120 extends in directions along the XY-plane orthogonal to the Z-direction. Therefore, the imaging optical system 120 can be somewhat smaller in the Z-direction.

SECOND EMBODIMENT

Figure 9:
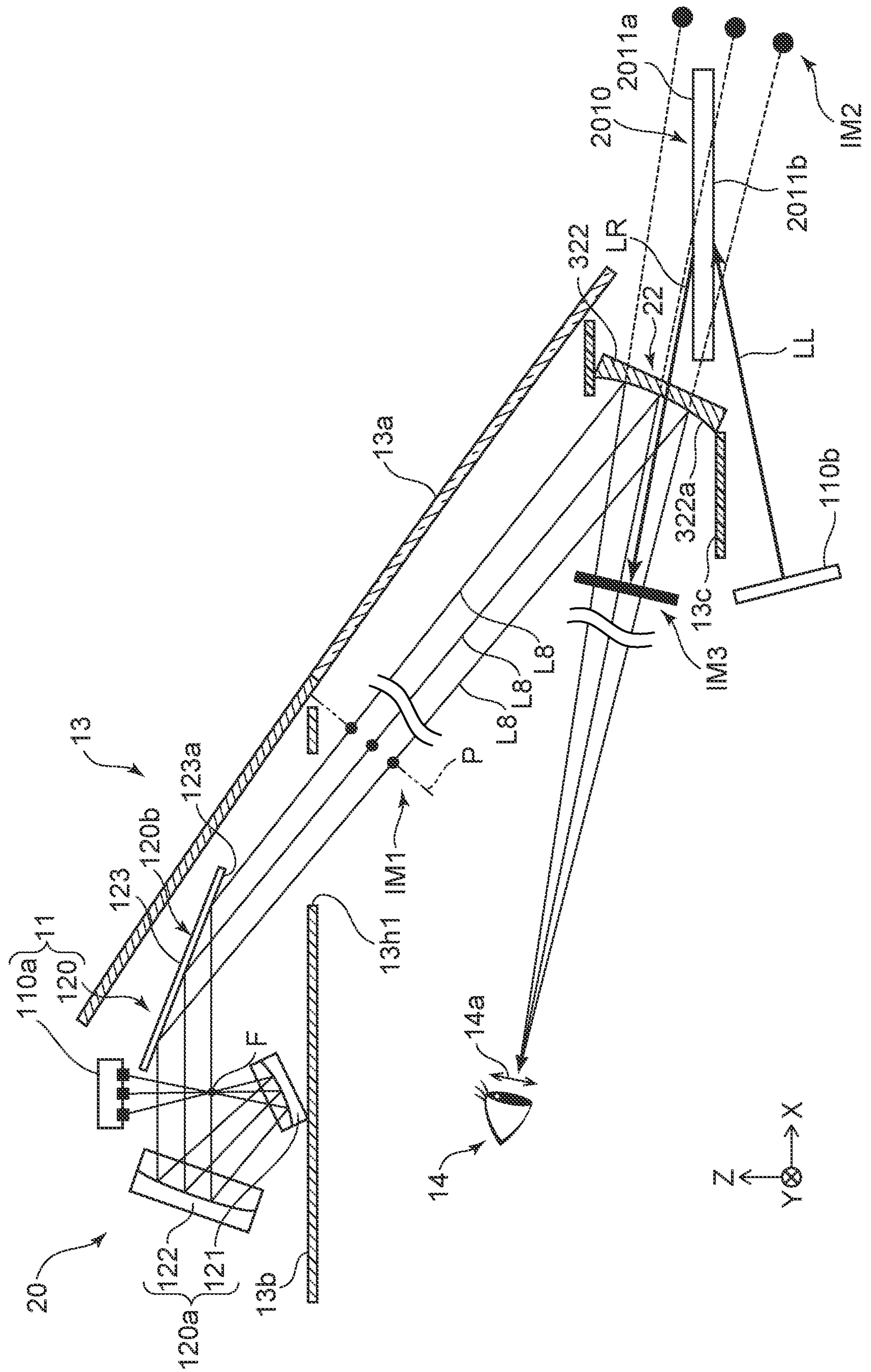
FIG. 9 is a schematic cross-sectional view illustrating an image display device according to a second embodiment.

FIG. 9 is a schematic cross-sectional view illustrating an image display device according to a second embodiment.

As shown in FIG. 9, the image display device 20 according to the embodiment includes the light source unit 11, the reflection unit 22, the display device 110*b*, and an image-forming element 2010. The image display device 20 according to the embodiment differs from the image display devices 10 and 10A shown in FIGS. 1 and 2 in that the image-forming element 2010 is included. Other than the image-forming element 2010, the image display device 20 according to the embodiment has the same configuration as the image display device 10A shown in FIG. 2. The same components are marked with the same reference numerals, and a detailed description is omitted as appropriate.

As described above, the HUD of the image display device 20 including the light source unit 11 and the reflection unit 22 is the same as the example shown in FIG. 2, and a detailed description is omitted. The configuration of the image display device 20 for realizing the mid-air display function of the display device 110*b* and the image-forming element 2010 will now be described in detail.

In the image display device 20 of the example of FIG. 9, the display device 110*b* and the image-forming element 2010 are located at the dashboard part 13*c* together with the reflection unit 22. The display device 110*b* is arranged in the −X direction and −Z direction of the mirror 322 of the reflection unit 22. The image-forming element 2010 is arranged in the +X direction of the mirror 322. The image-forming element 2010 includes a first surface 2011*a* and a second surface 2011*b*. The image-forming element 2010 is arranged to be substantially along the X-direction so that the first surface 2011*a* faces the +Z direction and the second surface 2011*b* faces the −Z direction.

The display device 110*b* emits the light LL toward the second surface 2011*b* of the image-forming element 2010. The light LL is incident on the image-forming element 2010, and the light LL is reflected by a dihedral corner reflector 2020 elaborated with reference to FIGS. 10A and 10B to emit the reflected light LR toward the first surface 2011*a* side.

The reflected light LR that is emitted toward the first surface 2011*a* side is transmitted by the mirror 322 and forms the mid-air image IM3. The display device 110*b* can form the mid-air image IM3 at the desired position by appropriately setting the angle with respect to the second surface 2011*b* of the light LL incident on the image-forming element 2010. By appropriately setting the position at which the mid-air image IM3 is formed, the user 14 can view the mid-air image IM3 at the same position as the eyebox 14*a* that can view the virtual image IM2.

A configuration of the image-forming element 2010 will now be described.

Figure 10A:
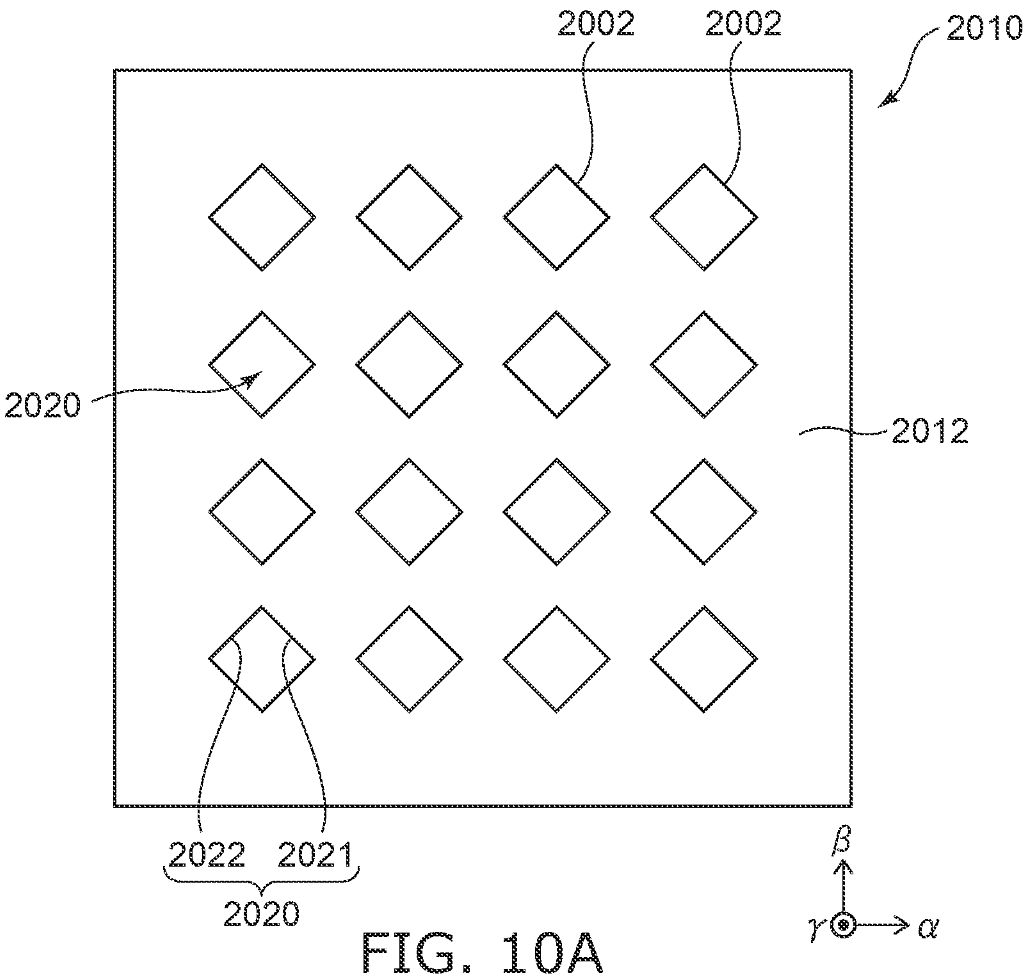
FIG. 10A is a schematic plan view illustrating an image-forming element of the image display device according to the second embodiment.

FIG. 10A is a schematic plan view illustrating the image-forming element of the image display device according to the second embodiment.

Figure 10B:
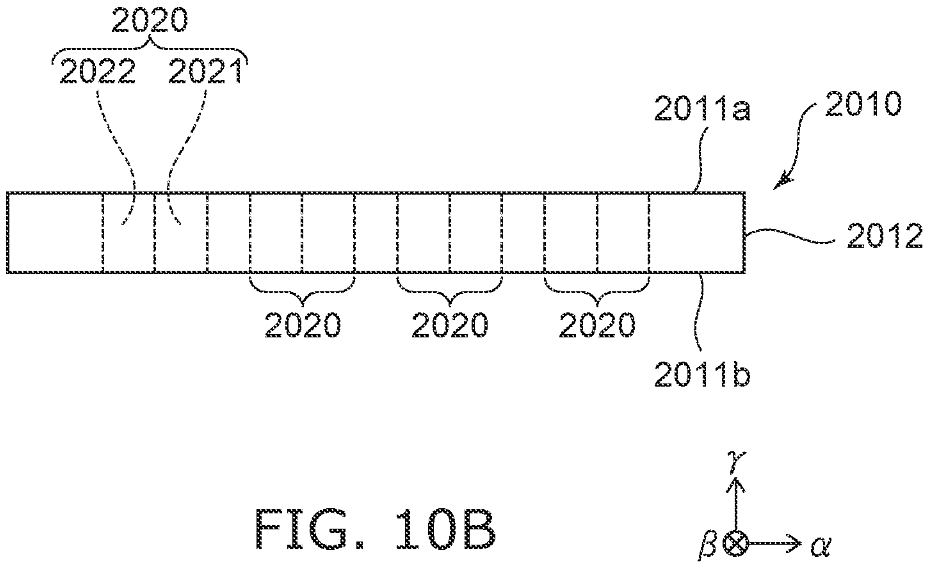
FIG. 10B is a schematic side view illustrating the image-forming element of the image display device according to the second embodiment.

FIG. 10B is a schematic side view illustrating the image-forming element of the image display device according to the second embodiment.

The αβγ orthogonal coordinate system is used in the description of the image-forming element 2010 as well. In the case of the image-forming element 2010, the αβ-plane is parallel to the first and second surfaces 2011*a* and 2011*b*. The direction from the second surface 2011*b* toward the first surface 2011*a* is taken as the positive direction of γ-axis.

As shown in FIGS. 10A and 10B, the image-forming element 2010 includes the dihedral corner reflector 2020. The dihedral corner reflector 2020 is provided in a base member 2012. For example, the dihedral corner reflector 2020 is formed as a continuous body with the base member 2012. The base member 2012 includes the first surface 2011*a* and the second surface 2011*b*. The second surface 2011*b* is at the side opposite to the first surface 2011*a*. The base member 2012 is, for example, a rectangular plate-like member and is formed of a synthetic resin, glass, etc.

The dihedral corner reflector 2020 is formed in a hole portion 2002 extending through the base member 2012 from the first surface 2011*a* to the second surface 2011*b*. The configurations of the hole portion 2002 and the dihedral corner reflector 2020 are simply illustrated in FIGS. 10A and 10B by illustrating the size of the hole portion 2002 to be large compared to the size of the base member 2012, and by illustrating the number of the hole portions 2002 formed to be less than the actual number.

The hole portion 2002 is square when the αβ-plane is viewed in plan, and is a square through-hole having the same shape over the thickness direction of the base member 2012. All of the hole portions 2002 are arranged to have the same shape and the same orientation. In the example of FIG. 10A, one side of the square of the hole portion is located at an angle of 45° from the α-axis.

The dihedral corner reflector 2020 is formed in the hole portion 2002. More specifically, the dihedral corner reflector 2020 includes two mirror surfaces 2021 and 2022. The mirror surface 2021 is located at one wall surface of the hole portion 2002, and the mirror surface 2022 is located at another one wall surface of the hole portion 2002. The mirror surfaces 2021 and 2022 are arranged to be adjacent. The mirror surfaces 2021 and 2022 reflect light. The remaining two wall surfaces of the hole portion 2002 do not reflect light.

The display device 110*b* emits light from the second surface 2011*b* side in an oblique direction toward the dihedral corner reflector 2020. The oblique direction is the direction of a straight line at an angle greater than 0° and less than 90° in the +γ direction from the αβ-plane. A portion of the light incident on the two mirror surfaces 2021 and 2022 is reflected by the dihedral corner reflector 2020 and emitted as twice-reflected light. The twice-reflected light that is emitted forms a mid-air image at the first surface 2011*a* side.

The once-reflected light of the light that is incident on the image-forming element 2010 and reflected only once by the dihedral corner reflector 2020 is emitted toward the first surface 2011*a* side. There are cases where the once-reflected light forms, as a ghost image, an image similar to the mid-air image at a different position from the mid-air floating image. By appropriately setting the angle of the incidence and emission of the light, the viewing of the ghost image can be suppressed by emitting the once-reflected light to a position that cannot be viewed by the user. For example, detailed operations, descriptions, and the like of an image-forming element using a dihedral corner reflector are described in Japanese Patent No. 4900618, etc.

Effects of the image display device 20 according to the embodiment will now be described.

The image display device 20 according to the embodiment provides effects similar to those of the image display devices 10 and 10A shown in FIGS. 1 and 2. Otherwise, the image display device 20 according to the embodiment provides the following effects. Namely, because the structure of the image-forming element 2010 is simple, a high-definition element can be formed with easy manufacturing and with high accuracy. A clear and high-definition mid-air image IM3 can be easily formed by using the display device 110*b* including an LED element.

THIRD EMBODIMENT

Figure 11:
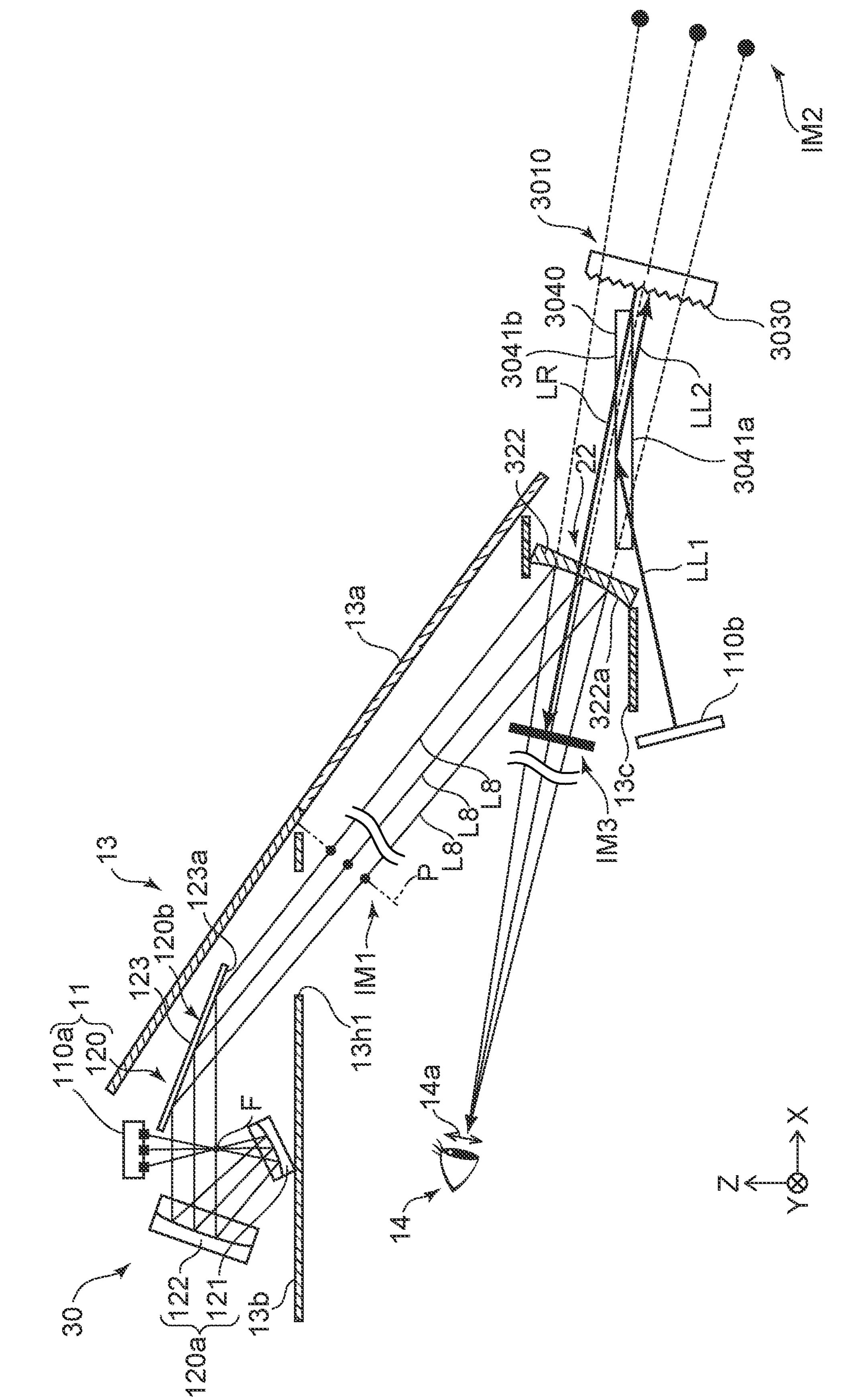
FIG. 11 is a schematic cross-sectional view illustrating an image display device according to a third embodiment.

FIG. 11 is a schematic cross-sectional view illustrating an image display device according to a third embodiment.

As shown in FIG. 11, the image display device 30 according to the embodiment includes the light source unit 11, the reflection unit 22, the display device 110*b*, an image-forming element 3010, and a half mirror 3040. The image display device 30 according to the embodiment differs from the image display devices 10 and 10A shown in FIGS. 1 and 2 in that the image-forming element 3010 and the half mirror 3040 are included. Other than the image-forming element 3010 and the half mirror 3040, the image display device 30 according to the embodiment has the same configuration as the image display device 10A shown in FIG. 2. The same components are marked with the same reference numerals, and a detailed description is omitted as appropriate.

As described above, the HUD of the image display device 30 including the light source unit 11 and the reflection unit 22 is the same as the example shown in FIG. 2, and a detailed description is omitted. The configuration of the image display device 30 having the mid-air display function including the display device 110*b*, the image-forming element 3010, and the half mirror 3040 will now be described in detail.

In the example of FIG. 11, the display device 110*b*, the image-forming element 3010, and the half mirror 3040 of the image display device 30 are located at the dashboard part 13*c* together with the reflection unit 22. The display device 110*b* is arranged in the −X direction and −Z direction of the mirror 322 of the reflection unit 22. The image-forming element 3010 is arranged in the +X direction of the mirror 322. The half mirror 3040 is arranged in the +X direction of the mirror 322 and located between the display device 110*b* and the image-forming element 3010. In the image-forming element 3010 of the example of FIG. 11, a retroreflective element (a retroreflective member) 3030 is located at the half mirror 3040 side.

Figure 12A:
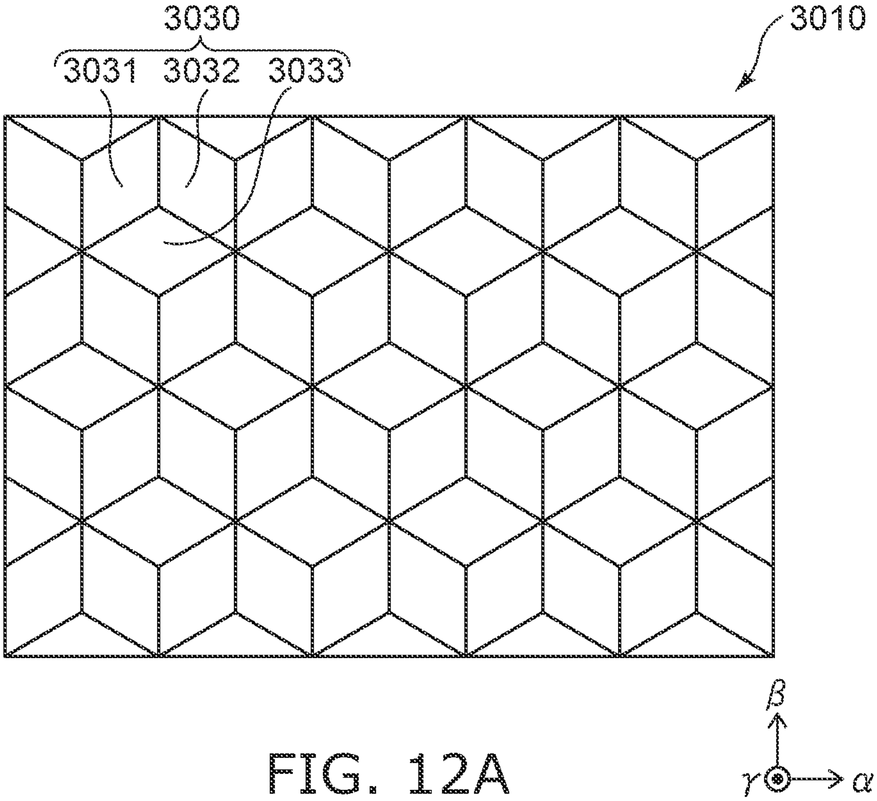
FIG. 12A is a schematic plan view illustrating an image-forming element of the image display device according to the third embodiment.

FIG. 12A is a schematic plan view illustrating the image-forming element of the image display device according to the third embodiment.

Figure 12B:
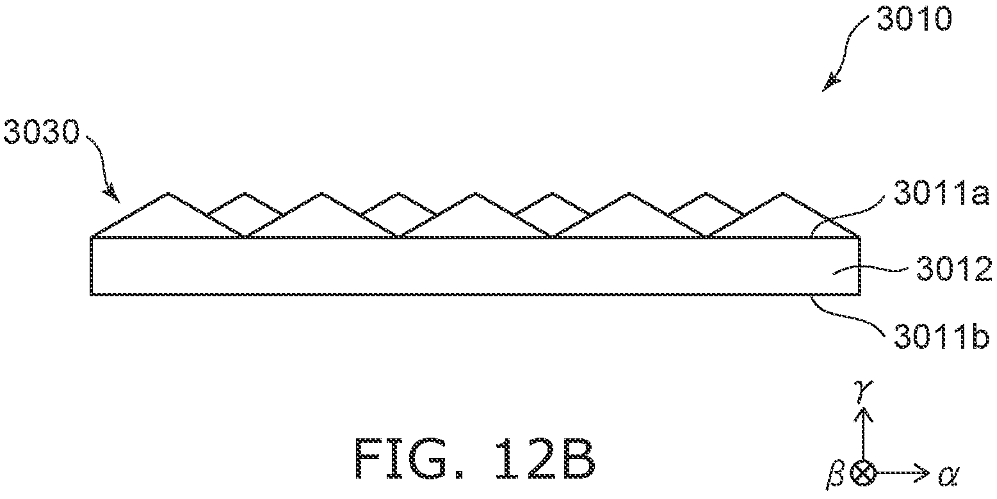
FIG. 12B is a schematic side view illustrating the image-forming element of the image display device according to the third embodiment.

FIG. 12B is a schematic side view illustrating the image-forming element of the image display device according to the third embodiment.

The αβγ orthogonal coordinate system is used in the description of the image-forming element 3010 as well. In the case of the image-forming element 3010, the αβ-plane is parallel to a first surface 3011*a* and a second surface 3011*b*. The direction from the second surface 3011*b* toward the first surface 3011*a* is the positive direction of the γ-axis.

As shown in FIGS. 12A and 12B, the image-forming element 3010 includes a base member 3012 and a retroreflective element 3030. The base member 3012 includes the first surface 3011*a* and the second surface 3011*b*. The second surface 3011*b* is positioned at the side opposite to the first surface 3011*a*. The base member 3012 is, for example, a rectangular plate-like member and is formed of a synthetic resin, glass, etc.

The retroreflective element 3030 that has a well-known configuration is located on the base member 3012 in the image-forming element 3010. The retroreflective element 3030 is formed by continuously forming three orthogonal mirror surfaces 3031, 3032, and 3033.

The light that is incident from the first surface 3011*a* side is reflected by the retroreflective element 3030 in the opposite direction of the incident direction. The reflected light that is reflected forms a mid-air image. According to the embodiment, the angle of the light that is incident on the retroreflective element 3030 is changed by using the half mirror 3040 to cause the formation position of the mid-air image to be different from the position at which the display device 110*b* used as the light source is located.

As shown in FIG. 11, the half mirror 3040 includes two surfaces 3041*a* and 3041*b*. The surface 3041*b* is at the side opposite to the surface 3041*a*. The half mirror 3040 is arranged so that the one surface 3041*a* faces the interior of the dashboard part 13*c*, and the other surface 3041*b* faces the mirror 322 side.

The brightness inside the dashboard part 13*c* is darker than outside the dashboard part 13*c*. Therefore, a light LL1 from the display device 110*b* located inside the dashboard part 13*c* is reflected by the half mirror 3040. A reflected light LL2 travels toward the image-forming element 3010. The retroreflective element 3030 is located at the mirror 322 side of the image-forming element 3010, and the retroreflective element 3030 emits the reflected light LR in the opposite direction of the direction in which the light LL2 is incident. The half mirror 3040 transmits the reflected light LR because the reflected light LR travels from the interior of the dashboard part 13*c* toward the brighter side outside the dashboard part 13*c*. The reflected light LR that is transmitted by the half mirror 3040 forms a mid-air image outside the dashboard part 13*c* via the mirror 322.

The position at which the mid-air image IM3 is formed is set by the positions and/or angles at which the display device 110*b*, the half mirror 3040, and the image-forming element 3010 are arranged. By appropriately setting these positions and/or angles, the mid-air image IM3 can be formed at the desired position.

The user 14 can simultaneously view the virtual image IM2 and the mid-air image IM3 because the mid-air image IM3 can be formed at the same position as the eyebox 14*a* with which the user can view the virtual image IM2. Detailed operations and descriptions of an image-forming element and an image display device using a retroreflective element are described in, for example, International Publication No. 2016/199902.

Effects of the image display device 30 according to the embodiment will now be described.

The image display device 30 according to the embodiment provides effects similar to those of the image display devices 10 and 10A shown in FIGS. 1 and 2. The image display device 30 according to the embodiment also provides the following effects. Namely, because the structure of the image-forming element 3010 is simple, a high-definition element can be formed by easy manufacturing with high accuracy. Because the retroreflective element 3030 of the image-forming element 3010 emits the reflected light, a ghost image other than the real image forming the mid-air image is not formed.

FOURTH EMBODIMENT

Figure 13:
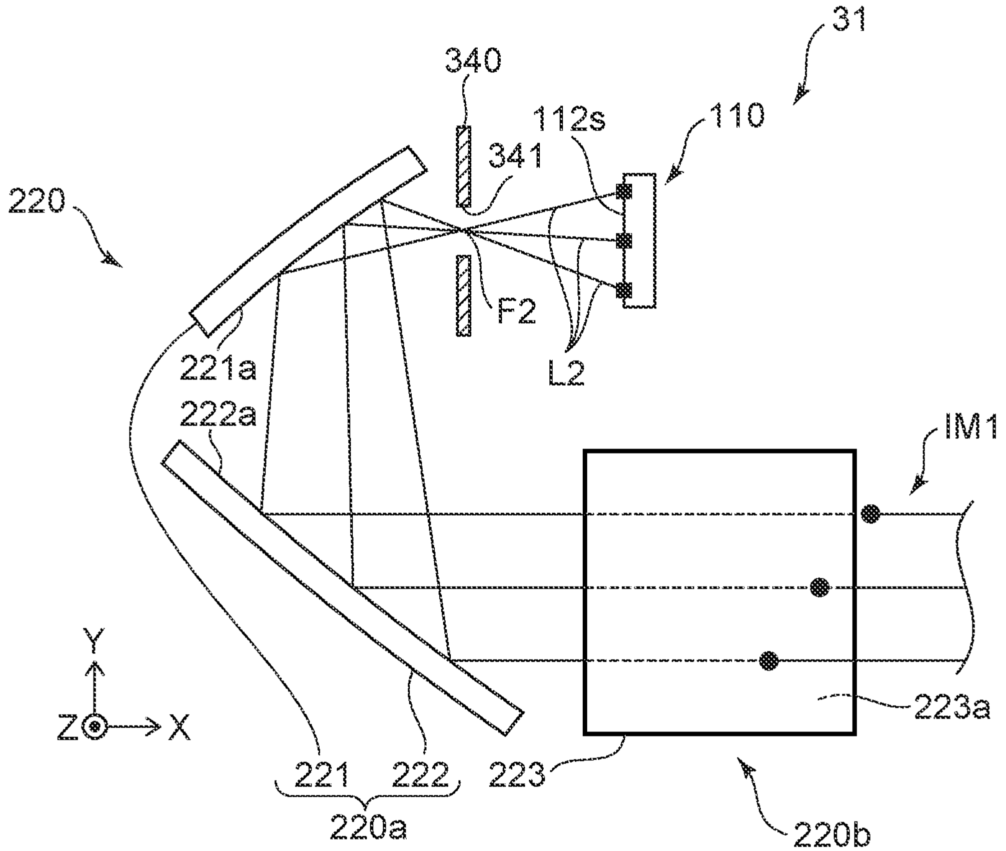
FIG. 13 is a schematic plan view illustrating a light source unit of an image display device according to a fourth embodiment.

FIG. 13 is a schematic plan view showing a light source unit according to a fourth embodiment.

As shown in FIG. 13, the light source unit 31 of the image display device according to the embodiment differs from the light source unit 11 shown in FIG. 1 in that a light-shielding member 340 is further included. FIG. 13 shows the light-shielding member 340 in cross section and the other components in end view.

An imaging optical system 220 includes an input element 221, an intermediate element 222, and an output element 223. The input element 221 and the intermediate element 222 are included in a bending part 220*a*, and the output element 223 is included in a direction modifying part 220*b*. A focal point F2 of the imaging optical system 220 is positioned between the display device 110 and the input element 221. In other words, the imaging optical system 220 is substantially telecentric at the side of the real image IM1 corresponding to the first image.

The input element 221 is a mirror that includes a concave mirror surface 221*a*. The input element 221 is located at the −X side of the display device 110 and faces the display device 110. The light that is emitted from the display device 110 is reflected by the input element 221. The intermediate element 222 is a mirror that includes a concave mirror surface 222*a*. The intermediate element 222 is located adjacent to the input element 221 in the Y-direction and faces the input element 221. The light that is reflected by the input element 221 is further reflected by the intermediate element 222. Multiple main rays L2 that are emitted from mutually-different positions of the display device 110 and pass through the focal point F2 are bent to become substantially parallel to each other by being sequentially reflected by the input element 221 and the intermediate element 222.

The output element 223 is a mirror that includes a flat mirror surface 223*a*. The output element 223 is located at the +X side of the intermediate element 222 and faces the intermediate element 222. Similar to the mirror surface 123*a* of the output element 123 according to the first embodiment, the mirror surface 223*a* is tilted in the −Z/+X direction with respect to the XY-plane. As a result, the output element 223 reflects the light reflected by the intermediate element 222 in a direction tilted with respect to the Z-direction in the −Z/+X direction.

Effects of the light source unit 31 of the image display device according to the embodiment will now be described.

The light-shielding member 340 is located between the display device 110 and the input element 221 of the imaging optical system 220. For example, the light-shielding member 340 has a flat plate shape substantially parallel to the ZY-plane. An aperture 341 that extends through the light-shielding member 340 in the X-direction is provided in the light-shielding member 340. The focal point F2 of the imaging optical system 220 is positioned inside the aperture 341. The light that is emitted from the display device 110 and passes through the focal point F2 and the vicinity of the focal point F2 passes through the aperture 341 of the light-shielding member 340 and is incident on the input element 221, and the greater part of the light other than the light passing through the aperture 341 is shielded by the light-shielding member 340.

As described above, the light source unit 31 of the image display device according to the embodiment further includes the light-shielding member 340. The light-shielding member 340 is located between the display device 110 and the imaging optical system 220. The light-shielding member 340 includes the aperture 341 through which a portion of the light from the display device 110 toward the imaging optical system 220 passes. The light-shielding member 340 shields another portion of the light from the display device 110 toward the imaging optical system 220, and can thereby suppress the incidence on the imaging optical system 220 of light, i.e., ineffective light, that is emitted by the display device 110 but does not pass through the focal point F2. The occurrence of stray light can be suppressed thereby. When light such as sunlight or the like from outside the light source unit 31 penetrates the light source unit 31, the light can be prevented from traveling toward the display device 110. A rise of the temperature of the display device 110 can be suppressed thereby. This is because problems such as misalignment of the optical axis due to thermal expansion, etc., occur when the temperature of the display device 110 rises above a prescribed value.

The light source unit 31 provides effects similar to those described above by applying the image display device 10 shown in FIG. 1, the image display device 10A shown in FIG. 2, the image display device 20 shown in FIG. 9, and the image display device 30 shown in FIG. 11.

FIFTH EMBODIMENT

Figure 14:
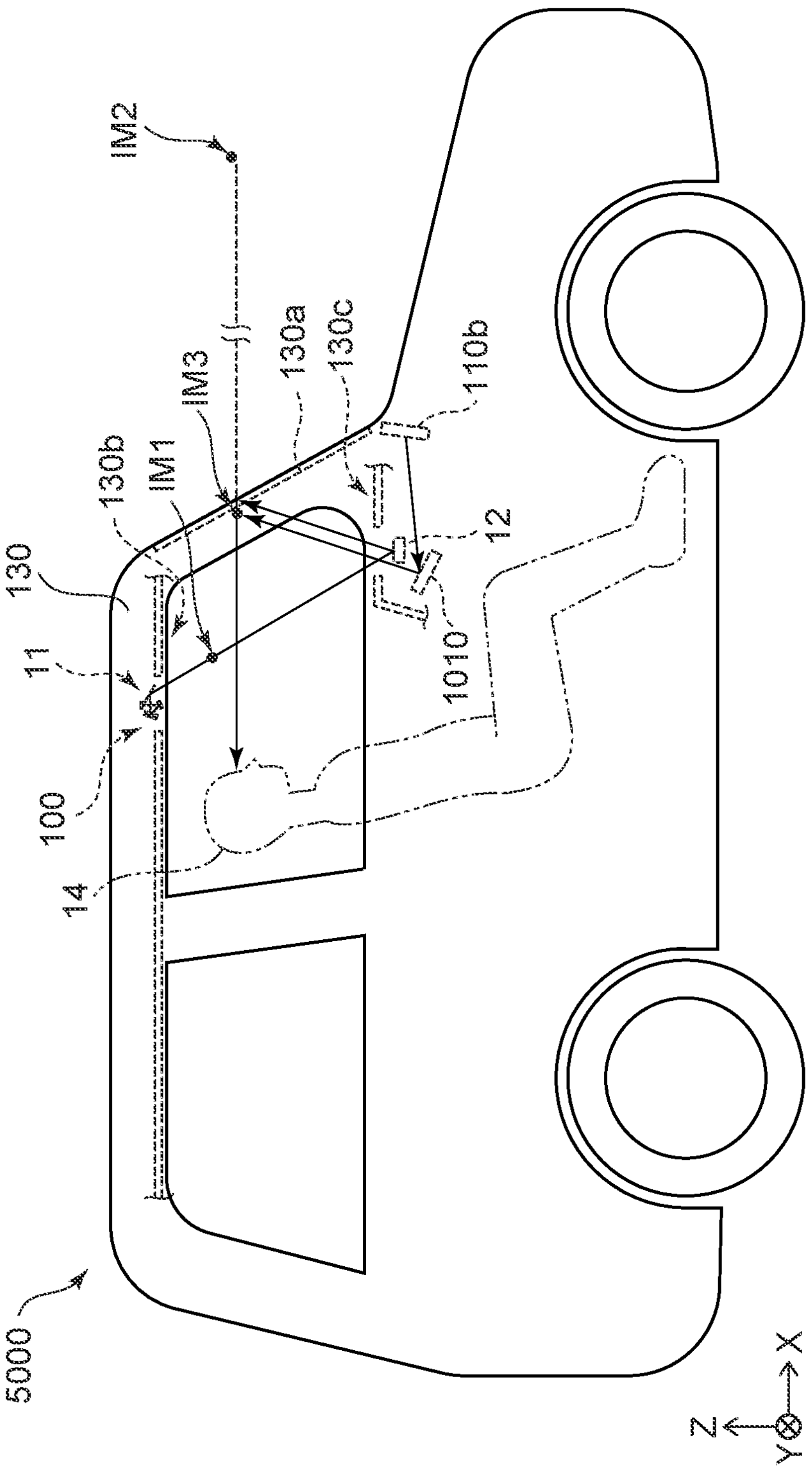
FIG. 14 is a schematic side view showing a vehicle in which an image display device according to a fifth embodiment is mounted.

FIG. 14 is a side view showing a vehicle in which an image display device according to the embodiment is mounted.

The image display device 100 according to the embodiment can be mounted in the vehicle 130 and used as a HUD. In other words, an automobile 5000 according to the embodiment includes the vehicle 130 and the image display device 100. The image display device 100 is located in the vehicle 130. The light source unit 11 of the image display device 100 is located at a ceiling part 130*b* of the vehicle 130. The reflection unit 12 of the image display device 100 is located at a dashboard part 130*c* of the vehicle 130. Here, the image display device 10 shown in FIG. 1, the image display device 10A shown in FIG. 2, the image display device 20 shown in FIG. 9, and the image display device 30 shown in FIG. 11 are applicable to the image display device 100.

The light source unit 11 that is located at the ceiling part 130*b* forms the real image IM1 corresponding to the first image between the light source unit 11 and the reflection unit 12. The reflection unit 12 reflects the light emitted from the light source unit 11. The greater part of the light reflected by the reflection unit 12 is reflected by the inner surface of a front windshield 130*a* and enters the eyebox of the user 14. As a result, the user 14 can view the virtual image IM2. The light source unit 11 also can be configured to have a continuous body with a rearview mirror unit (not illustrated), etc.

The configurations of the multiple embodiments and multiple modifications described above can be appropriately combined to the extent of feasibility.

As described above, the arrangement of the light source unit and the reflection unit can be set freely as long as the real image corresponding to the first image can be formed between the light source unit and the reflection unit, and the light emitted from the reflection unit can be irradiated on a reflecting surface such as the inner surface of a front windshield, etc.

What is claimed is:

1. An image display device comprising:
- a light source unit comprising:
  - a first display device configured to emit light having a substantially Lambertian light distribution and to display a first image, and
  - an imaging optical system comprising:
    - an input element on which light emitted from the first display device is incident, and
    - an output element on which light traveling via the input element is incident, the output element being configured to emit light that forms a real image corresponding to the first image;
- a reflection unit separated from the light source unit, the reflection unit configured to reflect light emitted from the imaging optical system;
- a second display device configured to display a second image; and
- an image-forming element configured to display the second image in mid-air based on light emitted from the second display device; wherein:
- the imaging optical system is substantially telecentric at the real image side; and
- the output element is configured to emit the light so as to form the real image between the light source unit and the reflection unit.

2. The image display device according to claim 1, wherein:
- the image-forming element comprises either:
  - a base member, and a reflector array provided on the base member, the base member including a first surface and a second surface, the second surface being positioned at a side opposite to the first surface, or
  - a reflector array provided in a base member, the base member including a first surface and a second surface, the second surface being positioned at a side opposite to the first surface;
- the reflector array comprises a plurality of reflector rows, each of the plurality of reflector rows comprising a plurality of dihedral corner reflectors arranged along a first direction;
- each of the plurality of dihedral corner reflectors includes:
  - a first reflecting surface configured to reflect light from the first surface side, and
  - a second reflecting surface orthogonal to the first reflecting surface, and configured to reflect a reflected light from the first reflecting surface toward the first surface side;
- in each of the plurality of reflector rows, an angle between a straight line and a virtual plane is set to a value greater than 0° and less than 90°, the first and second reflecting surfaces crossing at the straight line, the virtual plane including the first direction and a second direction, the second direction crossing the first direction;
- an angle between the first reflecting surface and the virtual plane is greater than 45° and less than 90°;
- the plurality of reflector rows includes a first reflector row of which the angle between the straight line and the virtual plane is set to a smallest value among the plurality of reflector rows;
- for reflector rows other than the first reflector row, the angle between the straight line and the virtual plane is set to values that increase away from the first reflector row in the second direction; and
- the second display device is located at the first surface side.

3. The image display device according to claim 1, wherein:
- the image-forming element comprises either:
  - a base member, and a reflector array provided on the base member, the base member including a first surface and a second surface, the second surface being positioned at a side opposite to the first surface, or
  - a reflector array provided in a base member, the base member including a first surface and a second surface, the second surface being positioned at a side opposite to the first surface;
- the reflector array comprises a plurality of reflector rows, each of the plurality of reflector rows comprising a plurality of dihedral corner reflectors arranged along a first direction;

the plurality of reflector rows is arranged in a second direction to be parallel to each other with a spacing interposed, the second direction crossing the first direction;

each of the plurality of dihedral corner reflectors includes:

a first reflecting surface configured to reflect light from the first surface side, and a second reflecting surface orthogonal to the first reflecting surface, and configured to reflect a reflected light from the first reflecting surface toward the first surface side;

in each of the plurality of reflector rows, an angle between a straight line and a virtual plane is set to a value greater than 0° and less than 90°, the first and second reflecting surfaces crossing at the straight line, the virtual plane including the first and second directions;

an angle between the first reflecting surface and the virtual plane is greater than 45° and less than 90°;

the plurality of reflector rows includes a first reflector row of which the angle between the straight line and the virtual plane is set to a smallest value among the plurality of reflector rows;

for reflector rows other than the first reflector row, the angle between the straight line and the virtual plane is set to values that increase away from the first reflector row in one direction along the second direction; and the second display device is located at the first surface side.

4. The image display device according to claim 1, wherein:

the image-forming element comprises a plurality of dihedral corner reflectors provided in a base member, the base member including a first surface and a second surface, the second surface being at a side opposite to the first surface; and the plurality of dihedral corner reflectors are configured to transmit light from the second surface toward the first surface.

5. The image display device according to claim 1, further comprising:

a half mirror configured to reflect, by one surface of the half mirror, the light emitted by the second display device; wherein:

the image-forming element comprises a retroreflective member configured to retroreflect light reflected by the half mirror such that light retroreflected by the retroreflective member is emitted via the half mirror.

6. The image display device according to claim 1, wherein:

the light emitted from the first display device has a light distribution pattern in which a luminous intensity in a direction of an angle θ with respect to an optical axis of the light emitted from the first display device is approximated by $\cos^n \theta$ times a luminous intensity at the optical axis, wherein n is a value greater than 0.

7. The image display device according to claim 6, wherein:

n is not more than 11.

8. The image display device according to claim 1, wherein:

the first display device is an LED display comprising a plurality of LED elements respectively at a plurality of pixels.

9. The image display device according to claim 8, wherein:

light emitted from each of the plurality of LED elements has a substantially Lambertian light distribution.

10. The image display device according to claim 8, wherein:

the first display device comprises a wavelength conversion member located on each of the plurality of LED elements.

11. The image display device according to claim 1, wherein:

the imaging optical system comprises a bending part comprising the input element, the bending part being configured to bend a plurality of main rays emitted from mutually-different positions of the first display device such that the main rays cross each other before being incident on the input element and reaching the real image; and the bending part is configured to bend the plurality of main rays to be substantially parallel to each other before and after the real image.

12. The image display device according to claim 11, wherein:

the imaging optical system further comprises a direction modifying part comprising the output element, the direction modifying part configured to modify a travel direction of the plurality of main rays traveling via the bending part to be directed toward a formation position of the real image.

13. The image display device according to claim 1, further comprising:

a light-shielding member located between the first display device and the imaging optical system, the light-shielding member comprising an aperture located such that a first portion of light from the first display device toward the imaging optical system passes through the aperture, and a second portion of the light from the first display device toward the imaging optical system is shielded by the light-shielding member.

14. An automobile comprising:

a vehicle; and the image display device according to claim 1 fixed to the vehicle.

* * * * *